US008711477B2

(12) United States Patent
Coleman et al.

(10) Patent No.: US 8,711,477 B2
(45) Date of Patent: Apr. 29, 2014

(54) POLARIZATION PRESERVING FRONT PROJECTION SCREEN MICROSTRUCTURES

(75) Inventors: David A. Coleman, Louisville, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 13/290,978

(22) Filed: Nov. 7, 2011

(65) Prior Publication Data

US 2012/0113508 A1      May 10, 2012

Related U.S. Application Data

(60) Continuation of application No. 12/538,642, filed on Aug. 10, 2009, now Pat. No. 8,072,681, which is a division of application No. 12/361,532, filed on Jan. 28, 2009, now Pat. No. 7,898,734.

(60) Provisional application No. 61/024,138, filed on Jan. 28, 2008.

(51) Int. Cl.
  *G03B 21/60* (2014.01)
(52) U.S. Cl.
  USPC ......................................................... 359/459
(58) Field of Classification Search
  USPC .......................................... 359/449, 451, 459
  See application file for complete search history.

(56) References Cited

U.S. PATENT DOCUMENTS

| 3,992,841 | A | 11/1976 | Ward, Jr. |
| 4,241,980 | A | 12/1980 | Mihalakis et al. |
| 4,298,246 | A | 11/1981 | Iwamura |
| 4,548,470 | A | 10/1985 | Erland |
| 4,792,850 | A | 12/1988 | Lipton |
| 4,911,529 | A | 3/1990 | Van De Ven |
| 5,186,780 | A | 2/1993 | Sakunaga et al. |
| 5,696,625 | A | 12/1997 | Malifaud et al. |

(Continued)

FOREIGN PATENT DOCUMENTS

| DE | 10359084 | 7/2005 |
| DE | 10359084 A1 | 7/2005 |

(Continued)

OTHER PUBLICATIONS

Patent Examination Report No. 1 dated Apr. 8, 2013 in Australian Patent Application No. 2009209209.

(Continued)

*Primary Examiner* — Christopher Mahoney
(74) *Attorney, Agent, or Firm* — Neil G. J. Mothew; Darlene K. Kondo

(57) ABSTRACT

Polarization preserving front projection screens and diffusers provide optimum polarization preservation for stereoscopic 3D viewing, as well as improved light control for enhanced brightness, uniformity, and contrast for both 2D and 3D systems. Generally, the disclosed screens direct light from a projector toward viewers within a diffusion locus, while maintaining optimum gain characteristics. More specifically, light incident on a region of the front projection screen from a predetermined projection direction is reflected by an engineered surface to a predetermined diffusion locus after undergoing substantially single reflections. The engineered surface, comprised of generating kernels, is used to optimally diffuse illumination light into a range of viewing angles, within the diffusion locus, with suitable gain profile, while optimally preserving polarization for 3D applications. Such a screen, when combined with matched polarization analyzing eyewear, provides extremely low cross-talk from any observation point.

48 Claims, 30 Drawing Sheets

(56) References Cited

U.S. PATENT DOCUMENTS

| | | |
|---|---|---|
| 6,452,653 B1 | 9/2002 | Yamanaka et al. |
| 6,600,600 B2 | 7/2003 | Chen |
| 6,807,003 B2 | 10/2004 | Kobayashi et al. |
| 6,865,023 B2 | 3/2005 | Shafer |
| 7,033,736 B2 | 4/2006 | Morris |
| 7,035,006 B2 | 4/2006 | Umeya et al. |
| 7,046,439 B2 | 5/2006 | Kaminsky et al. |
| 7,068,427 B2 | 6/2006 | Hopkins et al. |
| 7,110,175 B2 | 9/2006 | Lippey et al. |
| 7,417,794 B2 * | 8/2008 | Browning ............... 359/452 |
| 7,463,415 B2 * | 12/2008 | Shafer ................. 359/445 |
| 7,609,443 B2 | 10/2009 | Bertin-Mourot et al. |
| 7,768,704 B2 | 8/2010 | Burkum |
| 2002/0021387 A1 | 2/2002 | Larson |
| 2002/0034710 A1 | 3/2002 | Morris et al. |
| 2002/0155276 A1 | 10/2002 | Owusu et al. |
| 2004/0240054 A1 | 12/2004 | Aiura et al. |
| 2006/0082873 A1 | 4/2006 | Allen et al. |
| 2006/0291050 A1 | 12/2006 | Shestak et al. |
| 2007/0146876 A1 * | 6/2007 | Peterson et al. ......... 359/449 |
| 2007/0195407 A1 * | 8/2007 | Poulsen ............... 359/459 |
| 2007/0237578 A1 | 10/2007 | Boyd |
| 2007/0253085 A1 | 11/2007 | Wood |

FOREIGN PATENT DOCUMENTS

| | | |
|---|---|---|
| JP | 2001174751 A | 6/2001 |
| JP | 2006133627 A | 5/2006 |
| JP | 2007508589 A | 4/2007 |

OTHER PUBLICATIONS

Summary of Notice of Reasons for Rejection and Notice of Reasons for Rejection dated Apr. 30, 2013 in Japanese Patent Application No. 2010-544481.

U.S. Appl. No. 11/424,087 by Robinson filed Jun. 14, 2006 entitled "Achromatic Polarization Switches"; incorporated herein by reference. The application is available to Examiner on the USPTO database and has not been filed herewith.

U.S. Appl. No. 11/864,198 by Schuck et al filed Sep. 28, 2007 entitled "Polarization Conversion System for Cinematic Projection"; incorporated herein by reference. The application is available to Examiner on the USPTO database and has not been filed herewith.

International preliminary report on patentability in corresponding PCT/US09/032307 mailed Aug. 12, 2010.

Supplementary European Search Report in corresponding European application No. EP09705162.7.

International search report and written opinion for PCT/US09/32307 mailed Mar. 13, 2009.

* cited by examiner

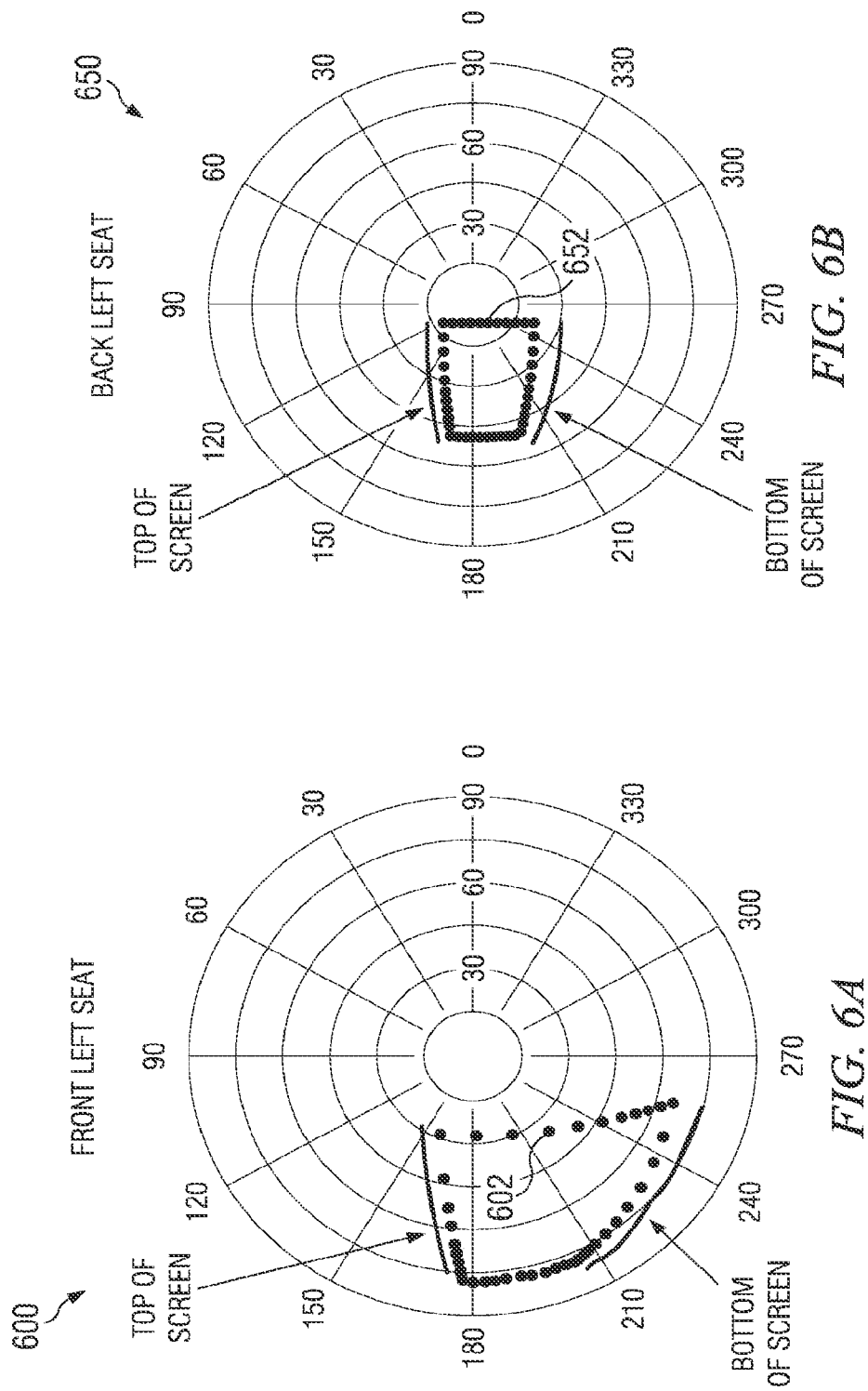

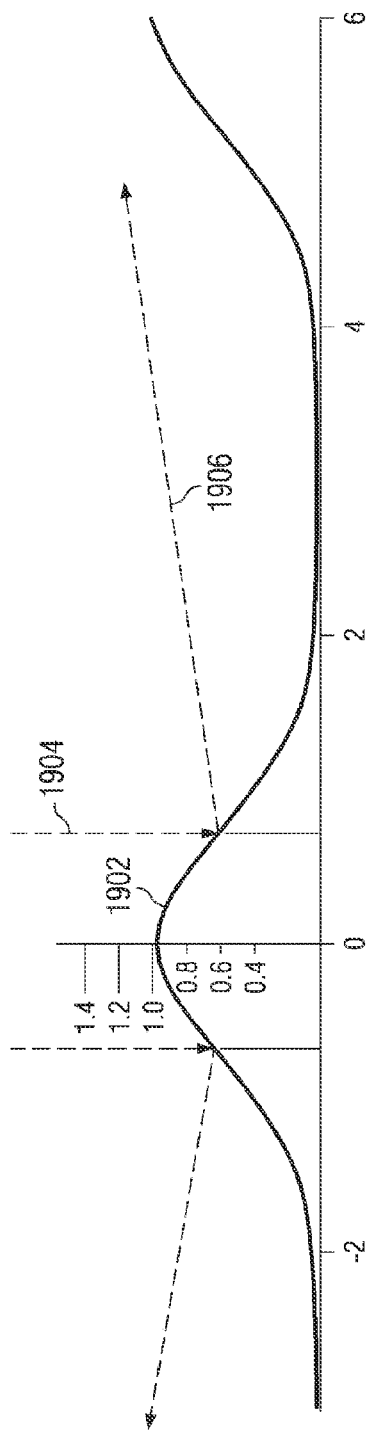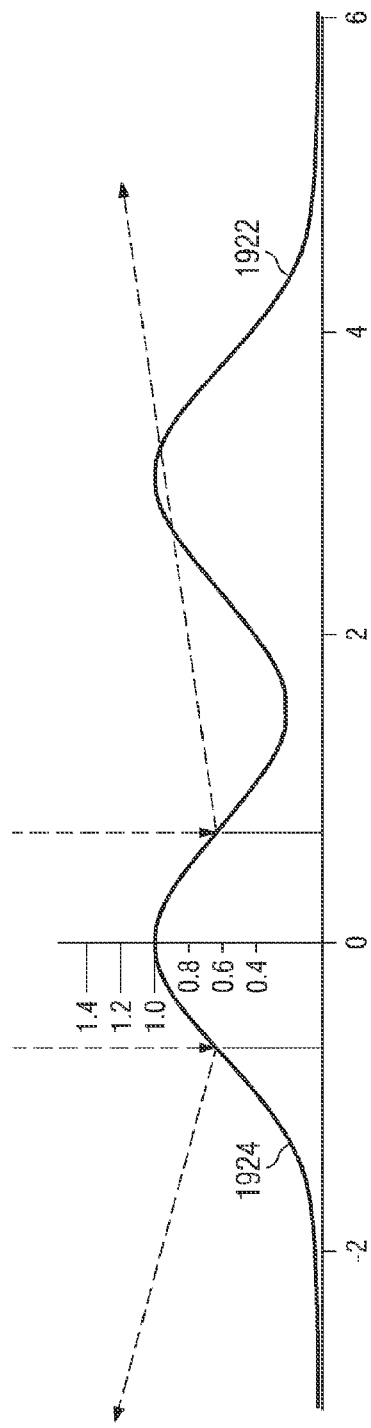

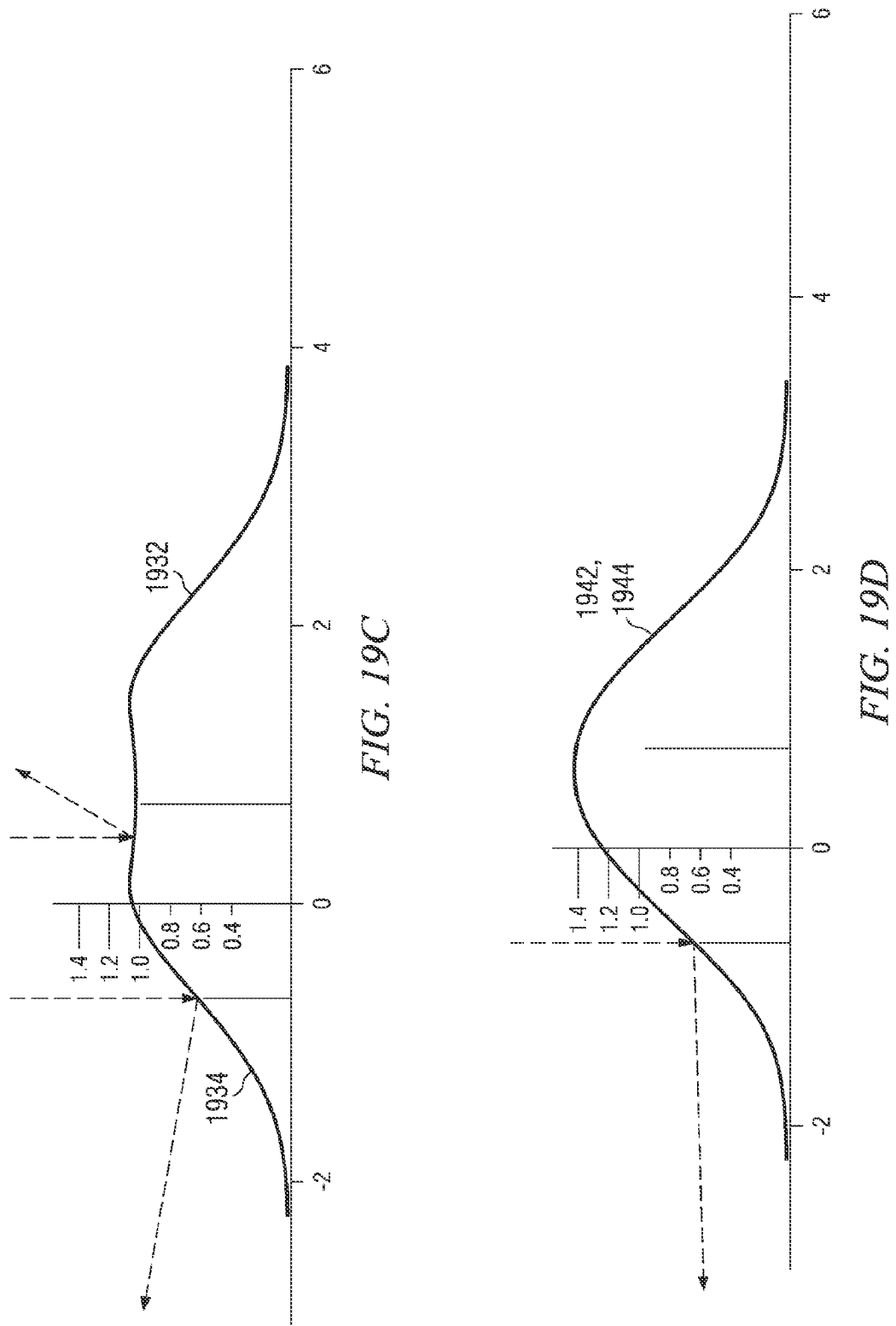

POLARIZATION PRESERVING FRONT PROJECTION SCREEN MICROSTRUCTURES

CROSS-REFERENCE TO RELATED APPLICATIONS

This is a continuation application and claims priority to U.S. patent application Ser. No. 12/538,642, filed Aug. 10, 2009 entitled "Polarization preserving front projection screen material" which is a divisional application of U.S. patent application Ser. No. 12/361,532, filed Jan. 28, 2009 entitled "Polarization preserving front projection screen," now U.S. Pat. No. 7,898,734, that is related to and claims priority to provisional patent application 61/024,138, filed Jan. 28, 2008 entitled "Polarization preserving front projection screen" which are herein incorporated by reference for all purposes.

BACKGROUND

1. Technical Field

This disclosure generally relates to the front-projection screens and more specifically relates to front projection screens that optimally manage the diffusion of light such that polarization is preserved. Such screens may additionally maximize image brightness and contrast subject to specific projector and observation angles.

2. Background

In stereoscopic 3D systems utilizing passive polarization analyzing eyewear, the screen is an integral part of the system. Any depolarization occurring at the screen results in crosstalk, where the image intended for one eye is partially transmitted to the opposite eye. This cross-talk is manifested as a "ghost image," which erodes the quality of the experience and creates eye fatigue. As such, it is desirable to provide extremely low cross-talk under the most extreme illumination and observation angular conditions.

Known front-projection screens, such as those used in the 2D cinema, are virtual Lambertian scatterers. Owing to the statistics of the surface roughness of such known screens, they have very poor polarization preservation and poor effective light efficiency (i.e., while total integrated scatter, or TIS, is high, utilization of light in angle space is poor).

A known technique for providing stereoscopic 3D polarization preserving screens is to spray-paint aluminum flake in a transparent binder onto a PVC substrate. Such statistical surfaces provide limited control of screen gain profile, directionality, and polarization. Moreover, coating processes frequently show resolvable structures (e.g. sparkle), and uniformity problems, such as textures. Such "silver screens" are frequently delicate, and are not able to withstand a mild abrasive cleaning process.

Lambertian screens provide uniform appearance in observed brightness, but make poor use of projection light. That is, a significant portion of incident light is scattered outside of the field of view, reducing system efficiency. Moreover, a portion of scattered light is directed back to the screen, reducing contrast and color saturation.

Accordingly, there is a need for a front projection screen which is engineered to optimally disperse light into a range of observation angles, such that the input state of polarization is accurately preserved.

BRIEF SUMMARY

This disclosure pertains to engineered reflective diffusers, and in particular to screens used in front projection systems. The screens provide optimum polarization preservation for stereoscopic 3D viewing, as well as improved light control for enhanced brightness, uniformity, and contrast for both 2D and 3D systems. The present disclosure seeks to direct light where it is desired, while maintaining optimum gain characteristics.

According to the present disclosure, an engineered surface is used to optimally disperse illumination light into a range of viewing angles, within a specific diffusion locus, with suitable gain profile, while optimally preserving polarization. Such a screen, when combined with matched polarization analyzing eyewear, provides extremely low cross-talk from any observation point.

Disclosed in the present application is a method for providing a polarization preserving reflective diffuser, wherein the diffuser provides light to a desired diffusion locus, subject to specific illumination conditions in a manner that preserves polarization. A viewing locus that includes substantially all viewing locations is located within the diffusion locus.

According to an aspect, the present application discloses a method for providing a polarization preserving front projection screen, wherein the screen provides light to a desired viewing range, or a locus of observation, in an auditorium, subject to projector illumination conditions. The method includes determining a locus that accounts for extremes of illumination and observation angle, that can provide substantially orthogonal polarization states to all viewing locations in the auditorium. The method also includes providing a plurality of reflective generating kernels and distributing the plurality of generating kernels over a substrate.

According to another aspect, a set of design rules are used to produce a generating function for the surface topography. The generating function provides the fundamental building blocks of the microstructure (comprising either one or a plurality of generating kernels), which carries with it the (macroscopic) ensemble statistics of the desired diffuser. Such a design can have superior uniformity in appearance, because it is statistically complete at the fundamental dimension. The design rules further provide for substantially only single reflections within a prescribed diffusion locus. The diffusion locus is defined in accordance with the angular extremes in illumination and detection/observation. In yet further design rule considerations, the generating kernel can provide a specific intensity distribution (e.g. Lambertian) within the diffusion locus, with a prescribed angular decay in intensity at the boundary of the diffusion locus. In a preferred embodiment that maximizes light efficiency, this decay is represented by a step function.

Other aspects will become apparent with reference to the disclosure herein.

BRIEF DESCRIPTION OF THE DRAWINGS

FIG. 6A is a polar graph illustrating the viewing locus of a specific auditorium defined by tracing the perimeter of the screen from the front left seat, in accordance with the present disclosure;

FIG. 6B is a polar graph illustrating the viewing locus of a specific auditorium defined by tracing the perimeter of the screen from the rear left seat, in accordance with the present disclosure;

FIGS. 19A-19D provides schematic diagrams showing plots of reflection conditions for different spacings between Gaussian peaks, in accordance with the present disclosure;

DETAILED DESCRIPTION

Figure 1A:
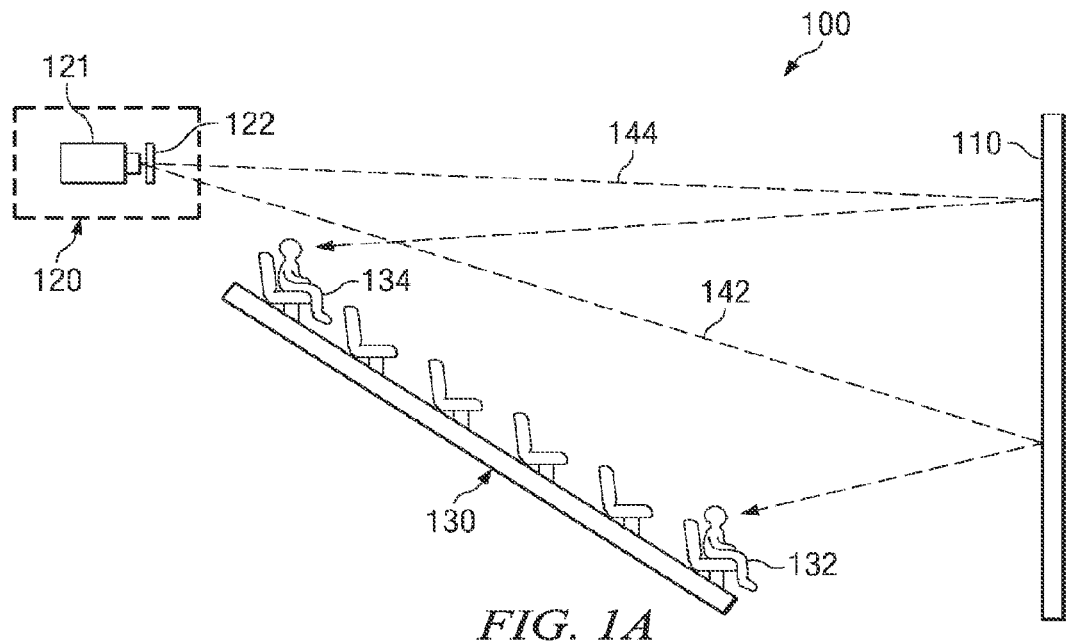
FIG. 1A is a schematic diagram illustrating a side view of a typical movie theatre, in accordance with the present disclosure.
Figure 1B:
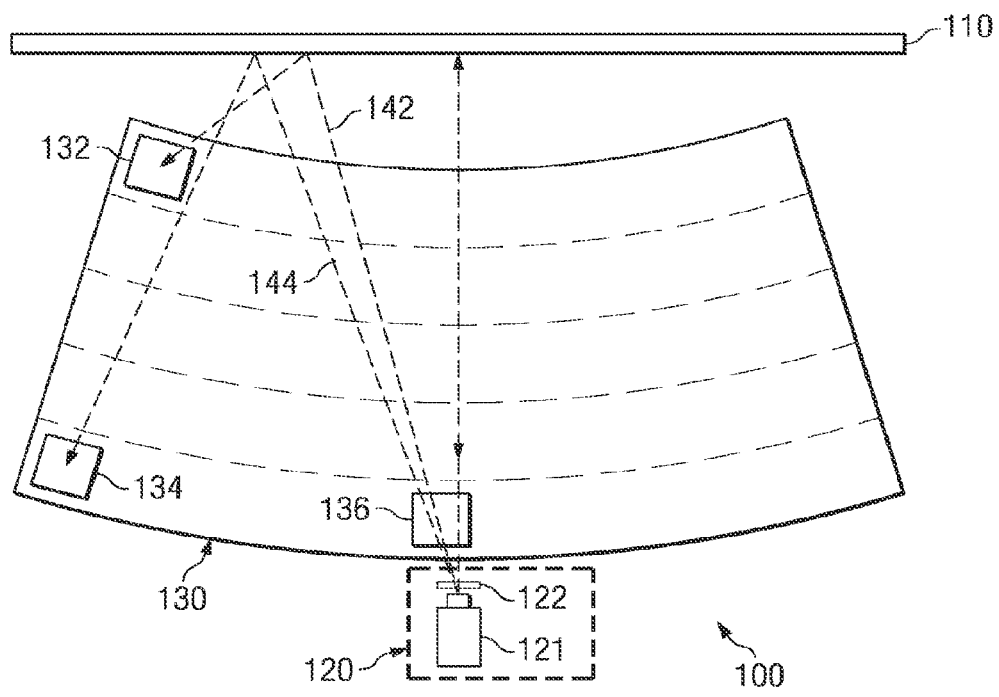
FIG. 1B is a schematic diagram illustrating a top-down view of a movie theatre, in accordance with the present disclosure.

FIG. 1A is a schematic diagram illustrating a side view of a typical movie theatre 100 and FIG. 1B is a schematic diagram showing a top-down view of a movie theatre 100. Movie theatre 100 includes a reflective screen 110, a projector platform 120, and a viewing area 130. Projector platform 120 may include projector 121 and polarization switch 122. Viewing area 130 may provide seats organized in rows away from the screen, defining a viewing area or viewing for viewers that may sit (or stand) in different places within the viewing area 130. For instance, a first viewer may be located at the front-left viewing position 132 of the movie theatre 100, and receive reflected light 142. A second viewer may be located at the rear-left viewing position 134 and receive reflected light 144. A third viewer be located in a central viewing position 136.

With recent developments of polarization technology, there has been a resurgence of three dimensional movies, decoded with matched eyewear. Known three dimensional projection systems project left- and right-eye images sequentially using orthogonal polarizations. For three-dimensional movie applications that use a single projector platform 120, a polarization switch 122 may be placed in the light path from the projector 121 after the projection lens. Such polarization switches are known, such as commonly-assigned U.S. Pat. No. 4,792,850 (expired), entitled "Method and system employing a push-pull liquid crystal modulator" to L. Lipton et al., and commonly-assigned U.S. patent application Ser. No. 11/424,087, entitled "Achromatic polarization switches" to M. Robinson, both hereinafter incorporated by reference. In alternative projector platforms, two or more projectors may be used, one to provide left-eye imagery with one polarization state and the other to provide right-eye imagery with the orthogonal polarization state. Conventional reflective screens include silver screens that reflect the polarized light from the projector 120 to the moviegoer.

Typical 3D cinema systems are relatively light starved. A fourteen foot-lamberts of brightness to the audience will typically provide substantially lower brightness in 3D mode. One reason for this, for example, is that sequential systems typically suffer both a polarization loss (usually greater than 50%) and a time-sharing loss (usually greater than 50%), so such systems are typically delivering below 25% brightness, or 3.5 foot-lamberts without a gain screen. Recent developments to address the problem, such as the RealD XL system and commonly-owned U.S. patent application Ser. No. 11/864,198, entitled "Polarization conversion system for cinematic projection," by M. Schuck, G. Sharp & M. Robinson, filed Sep. 28, 2007 (herein incorporated by reference), provide a polarization recovery function, but there remains a desire to increase brightness while preserving polarization.

In systems calling for polarization preservation, total integrated scatter (TIS) from a typical silver screen is approximately 40%, further reducing efficiency. While the gain of the screen is high (2.2-2.5 on axis), from a centered viewing position, the overall perceived image brightness is impacted due to rapid fall-off with viewing angle. Conversely, matte screens deliver high TIS (>90%), but make poor use of light in angle space. Generally, disclosed embodiments seek to maximize image brightness by exploiting both high total integrated scatter (approximately greater than 85%), as well as diffusion angle control. Such screens can improve the efficiency of both 2D and 3D experiences.

Figure 2:
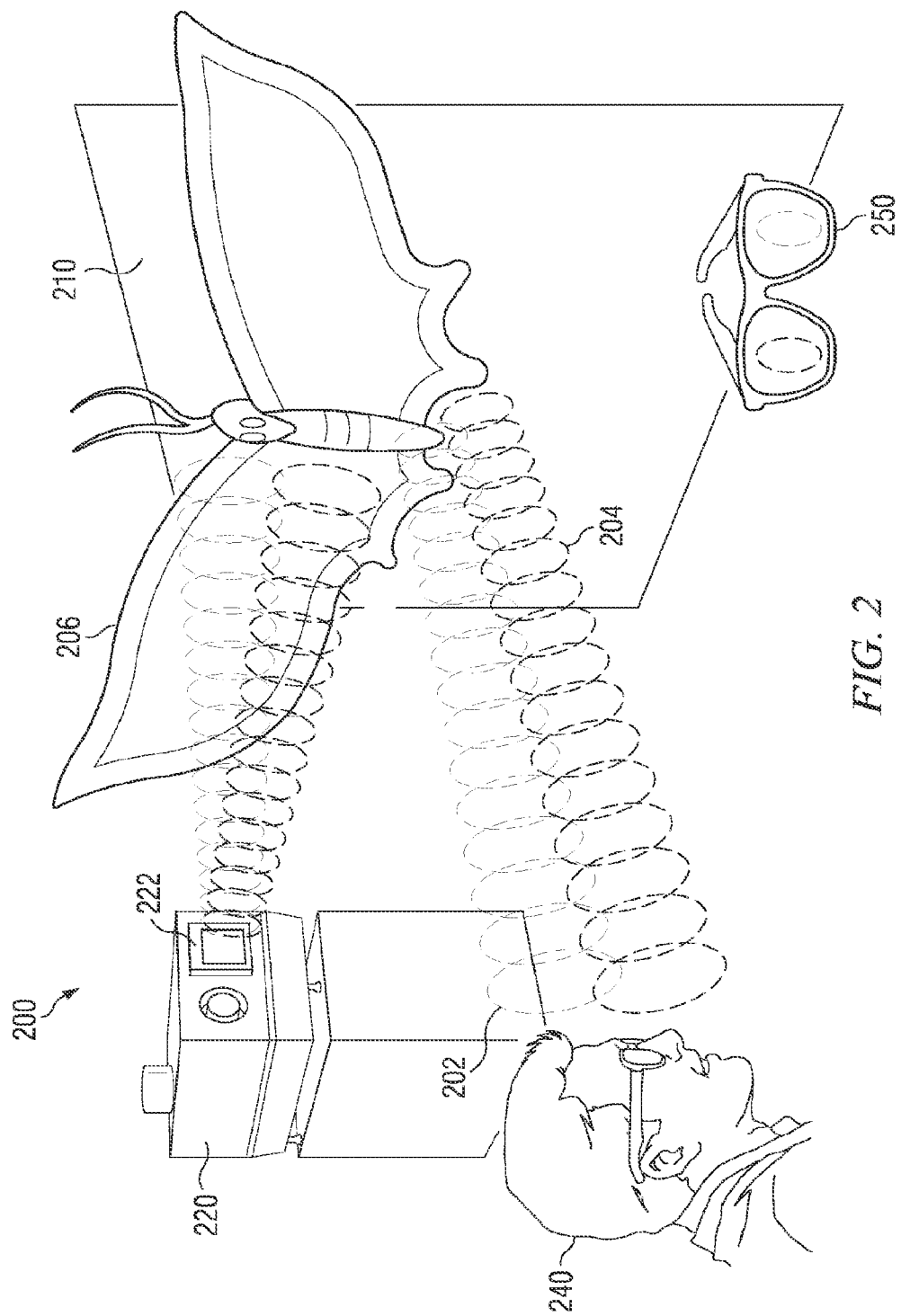
FIG. 2 is a schematic diagram illustrating the operation of an exemplary three-dimensional movie projection system, in accordance with the present disclosure.

FIG. 2 is a schematic diagram illustrating the operation of an exemplary stereoscopic three-dimensional movie projection system 200 using a single-projector (sequential) platform 220. In operation, left-eye images 202 and right-eye images 204 may be projected sequentially from the projector 220 through polarization switch 222 toward a polarization-preserving screen 210. Polarization-preserving screen 210 allows the polarized light from the projector 220 and polarization switch 222 to be reflected to the moviegoer 240. The left- and right-eye images are viewed by the moviegoer 240 wearing eyewear 250 that decode the respective orthogonally polarized light to create the experience of depth for object 206.

Generally, the quality of the stereoscopic viewing experience depends upon the ability of the screen 210 to preserve the high degree of polarization transmitted by the projector platform 220. Typical matte (near-Lambertian) cinema screens are generally not suitable for use with such 3D systems because the scattering is largely diffuse. Owing to statistics of feature size/height and slope probability density relative to the illuminating wavelength, such screens are almost completely depolarizing. However, a high quality stereoscopic 3D experience preferably uses at least a 100:1, and more preferably, a 200:1 or higher contrast ratio between the transmitted and blocked images, respectively.

To date, in order to preserve polarization, so-called "silver screens" have been used. Silver screens involve spray painting a poly-vinyl-chloride (PVC) substrate, which may or may not have embossed surface features, with aluminum flake dispersed in a transparent binder. The tendency is for the facets of the flake to lie nearly parallel to the substrate plane, thus generating a relatively high specular reflectance and gain with a matte substrate. Efforts to soften hot-spots, or over-saturation at certain points of a screen with darker peripheries, and to reduce gain often result in a tradeoff between appearance, uniformity, and cross-talk. For instance, matting agents can be included which randomize the air/binder interface, thus decreasing the hot-spot associated with specular reflection. When evaluating performance in the direction normal to the screen 110 (i.e., toward viewing position 136 of FIG. 1), it is common to have linear polarization contrast-ratio in excess of 150:1. But this falls rapidly with angle, predominantly because of loss in image brightness. As a result, there are frequently seats in a cinema auditorium for which the contrast may sometimes fall below 20:1 in certain locations, such as viewing positions 132 and 134.

Other problems associated with the current metal flake screens are the "graininess" and "speckle" arising from the finite sized and uncontrolled statistical arrangement of the flakes. For the conventional matte screen, scattering is accomplished via a high density of extremely small scattering centers. Consequently, ergodic statistics are achieved over a relatively small spatial region of the diffuser and the appearance is uniformly white. By contrast, a flake screen consists of macroscopic (greater than a micron) features and so require a considerably larger region to encompass the same ergodic statistics. Typically this region is larger than the resolution of the human eye and so spatial variation in the scattered intensity is readily visible, i.e., the surface appears "grainy." As the scattered angle increases, the relative number of facets contributing to the intensity decreases, thereby exacerbating the "graininess" and "speckle" problems.

A coherent contribution to the uniformity also becomes apparent in a flake screen. Despite the incoherent nature of the original projection light source, after propagation over the length of an auditorium, the illumination achieves a high degree of collimation and thus a relatively large transverse spatial coherence (as large as several hundred microns). Facets located within this coherence length can interfere constructively or destructively to modulate the perceived intensity in a substantially chromatic way. This is observable on a conventional silver screen as a faintly colored speckle pattern that is superimposed on the overall graininess of the screen. However, because the interference effect depends very sensitively on the angle of reflection, the speckle pattern appears to move relative to the screen when the observer shifts their head. The temporal coherence of the light remains small though, and therefore in order to experience an interference effect, the contributing facets should be located approximately coplanar to the incident and reflected wavefronts, i.e., the effect is maximized in the retro-reflecting direction and decreases as the scattered angle increases.

Polarization Contrast Ratio and Gain

The contrast associated with cross-talk is given as the ratio of brightness observed for light passing through the transmitting lens to that which passes through the blocking lens. Variables affecting the polarization contrast ratio (PCR) include polarization basis vector, projection geometry, observation position, and point observed on the screen. With a Lambertian screen, the term in the numerator is virtually constant with observation position. But with conventional silver screens, the gain is sufficiently high that the fall-off in the numerator term often dominates the angular dependence of PCR. One way of characterizing a screen is to measure the polarization sensitive bi-directional reflectance distribution function (BRDF), which is the reflectivity per solid angle.

Figure 3:
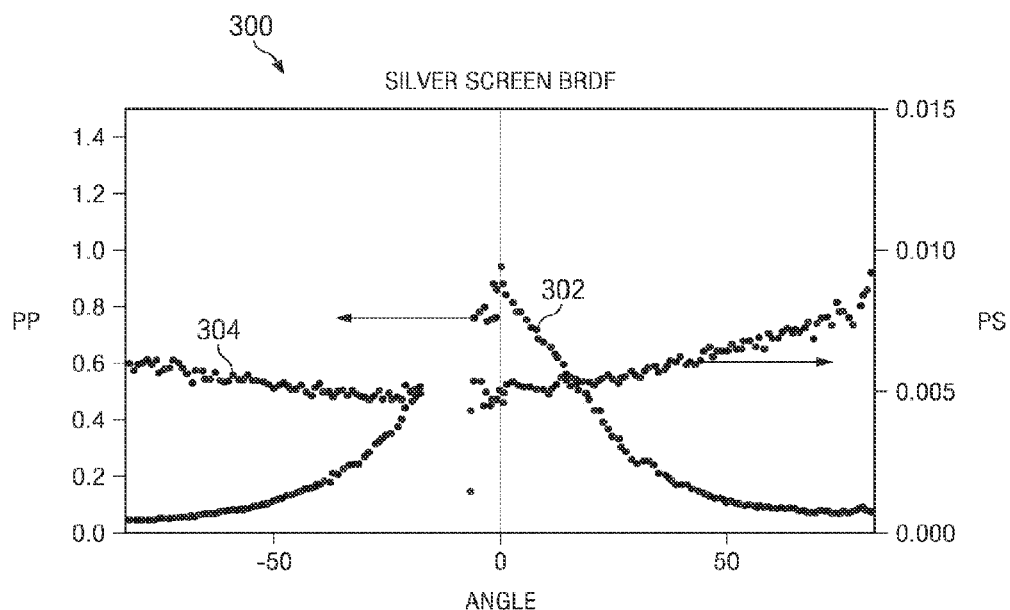
FIG. 3 is a graph illustrating the polarization-preserving performance of a conventional silver screen as a function of viewing angle.

FIG. 3 is a graph 300 illustrating the polarization-preserving performance of a conventional silver screen as a function of viewing angle. Graph 300 shows a BRDF measurement of a conventional silver screen using a collimated source (HeNe laser with a 0.633 µm wavelength), where a P-oriented polarizer is inserted in the illumination path, and either a P- or S-oriented polarizer is used in the detection path. P and S are unit vectors parallel and perpendicular to the plane of incidence in the global (substrate) coordinate system, respectively. This should not be confused with the local coordinate system, which is associated with individual reflecting facets embedded in the screen. To obtain these measurements, the screen was illuminated at −5° off-normal (corresponding to −10° on the plot), so that the specular direction corresponds to 0°. The detector scanned the in-plane angles, where drop-outs occurred due to the finite size of the detection module.

In FIG. 3, the PP plot 302 corresponds to the parallel polarizer BRDF, which closely tracks the gain profile. The PS plot 304 is the crossed-polarizer BRDF, corresponding to the power converted to S-polarization through the combination of several mechanisms, as a function of scatter angle. This term is relatively "white" in angle space, as would be expected for a diffuse scatter component.

Figure 4:
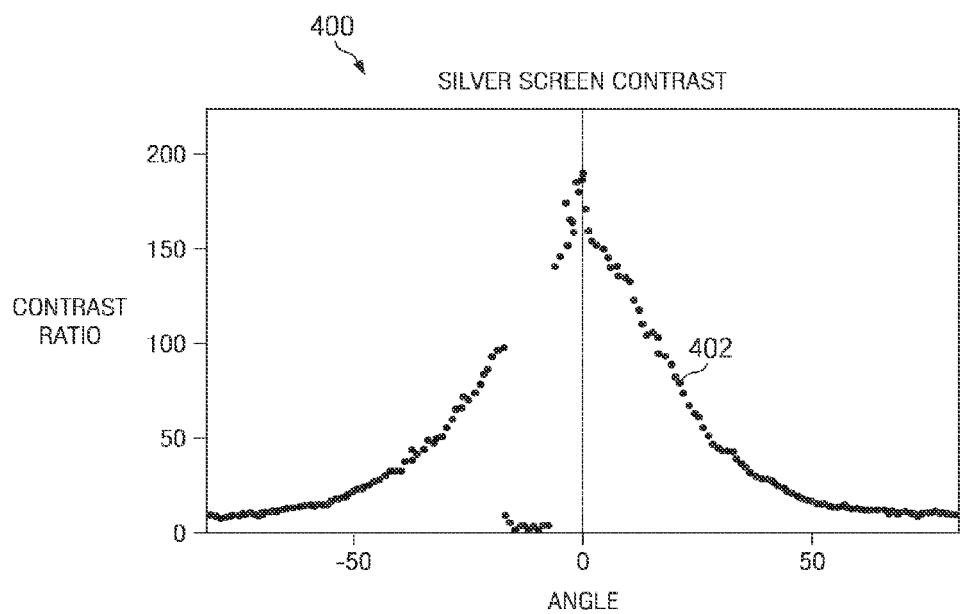
FIG. 4 is a graph illustrating the polarization-preserving contrast performance of a conventional silver screen as a function of viewing angle.

FIG. 4 is a graph 400 illustrating the polarization-preserving contrast performance of a conventional silver screen as a function of viewing angle. The polarization contrast ratio (PCR) 402 is plotted as a function of observation angle and is a ratio of the PP BRDF plot 302 to the PS BRDF plot 304 shown in FIG. 3. It will be shown later that this corresponds to a "best case" contrast for linear polarization from a Fresnel standpoint, as the input polarization is contained in the plane of incidence.

Figure 5:
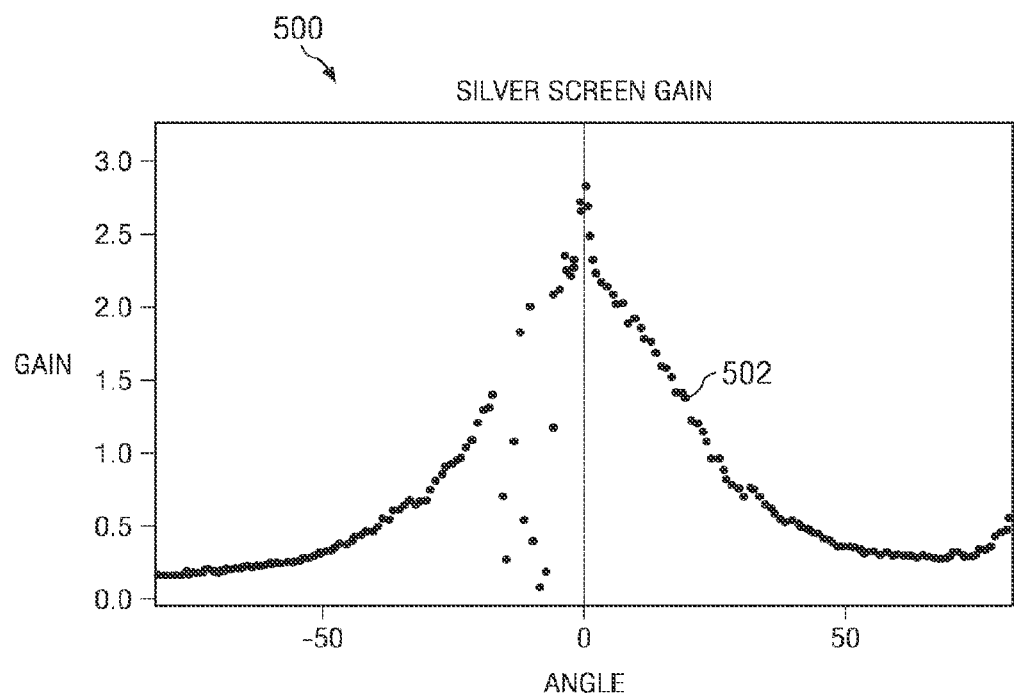
FIG. 5 is a graph illustrating the gain curve of a conventional silver screen as a function of viewing angle.

FIG. 5 is a graph 500 illustrating the gain curve of a conventional silver screen as a function of viewing angle. The gain curve 502 shows the ratio of the PP BRDF to that of a Lambertian scatterer, and as such is independent of polarization. For this screen, the contrast is halved at about 20°. Because the PCR tracks the gain, high gain screens typically show the highest spatial non-uniformity in observed cross-talk.

The above measurements shown in FIGS. 3-5 illustrate that with conventional silver screens, that the BRDF is nearly independent of incidence angle in the specular direction. The numerator of the PCR of a gain screen thus depends primarily on the angular difference between the observation ray and the specular direction. The specular direction corresponds to the direction the ray would travel if the screen surface were a mirror.

Factors that determine the cross-talk leakage term (denominator) include:

1. Depolarization due to diffuse scatter from features much smaller than the illuminating wavelength. This may include surfaces of reflecting particles which are nano-scale rough, sharp edges of particles, and voids in coatings which expose the underlying matte substrate.

2. Polarization change due to local anisotropy of binder or additive materials.

3. Polarization change on (specular) reflection from a single surface.

4. Multiple reflections which, on an optical scale, result from surfaces which are highly sloped with respect to the illumination direction.

The present disclosure seeks to overcome the limitations in contrast associated with conventional statistical surfaces such as conventional silver screens. Engineered surfaces in accordance with the present disclosure may provide more desirable gain profiles using all-reflective dispersion means, which do not exhibit excessive reflectivity in the specular direction. Contributions due to the mechanisms listed above can be severely minimized, if not virtually eliminated. Moreover, control of the slope probability density function allows each observer to have a similar high-contrast experience via improved uniformity in brightness. Finally, engineered surfaces may allow enhanced image brightness, by directing projection light to seat locations. This further improves color saturation and image contrast by reduction in stray light. Using the processes described herein, screen material can be manufactured with the highest quality at the lowest possible price.

Factor 1—depolarization due to diffuse scatter from features much smaller than the illuminating wavelength—refers to depolarization associated with interaction of incident light with surfaces that are approximately on the scale of a few nanometers, to a few hundred nanometers. The contribution of this term tends to be virtually white in (projection and observation) angle space and insensitive to polarization basis vector. When observed under a crossed-polarizer microscope, the contribution appears as a background "glow." This term can be virtually eliminated through the use of high quality optical coatings (low rms roughness) which are substantially free of voids and are conformal to an embossed surface topography which is free of features at this level.

Factor 2—polarization change due to local anisotropy of binder or additive materials—is associated with optically thick "transparent" coatings. Such coatings can have anisotropy, which modifies the local state of polarization. The teachings of the present disclosure may eliminate this contribution by using single-surface reflection from a mirror-like metal coating. Any additional layers may be low birefringence oxide-like dielectrics which are applied relatively thin, having virtually zero retardation.

Factor 3—polarization change on (specular) reflection from a single surface—refers to the geometry of the local reflecting surface and is a result of fundamental differences in the complex reflection of S and P polarizations. The associated loss in PCR is relatively insignificant for the typical angles between projection/observation for most cinema environments, but can become significant in more demanding situations. It will be shown that additional conformal dielectric coatings over the metal surface can further reduce this contribution.

Factor 4—multiple reflections resulting from surfaces that are highly sloped with respect to the illumination direction—refers to multiple reflections that can occur (and in certain situations are at a maximum) at normal incidence/observation. They are usually associated with highly sloped diffusing structures. That is, a ray that continues in the forward direction after a single reflection, or does not clear adjacent structures after a single reflection, undergoes a secondary reflection. The mean-free path between such events can be much larger than the reflecting feature size, thus leading to other undesirable (image quality) effects. A double-reflected ray can have a highly altered polarization state, thus degrading polarization contrast ratio. Moreover, the impact of such reflections is a function of the polarization basis vector, as will be demonstrated.

Diffuse Scatter

Factor 1 can be virtually eliminated by using continuous micro-reflective structures that contain little or no contribution at the high spatial frequencies associated with diffuse scatter. Theoretically, this can be partially accomplished using some of the design capabilities described by Morris et al. in U.S. Pat. No. 7,033,736 (herein incorporated by reference), where arbitrary slope probability density functions can be generated, typical of diffuse scatterers, using all-reflective means. Further, these structures can have pseudo-random distributions in size, location, slope, and height which ensure a matte appearance without compromising performance.

From a practical standpoint, the engineered structures (diffusers) of the present disclosure should preferably be mass-produced consistently in a manufacturing environment. This may involve roll-to-roll embossing of generating kernels consistent with the specifications described herein. Moreover, subsequent coatings should preferably be applied with a similar high level of quality, for example, by evaporation or sputtering. Although the disclosure describes the use of the diffuser/screens in a cinema environment, it is contemplated that they may be alternatively be used in other environments where visual media is viewed, such as, but not limited to home theatre, gaming systems, virtual reality, flight simulators, etcetera.

Current statistical surfaces (e.g., conventional silver screens) invariably have reflector fill-factor below the desired 100%, where fill-factor is defined as the ratio of metalized area to total area. Here, the metalized area is assumed to have zero transmission. But in the event that the reflector is partially transmitting, another depolarization mechanism can come into play. More typically with silver-screens, small pinholes in the coating expose the depolarizing matte substrate (which is often white). In the event that pinholes are unavoidable, it is desirable to use a highly absorbing base substrate (e.g., matte black) since that will lead to a significantly reduced transmission of depolarized light. Screens that are manufactured using, for example, gravure printing processes usually have low fill-factor, so their PCR is dominated by substrate depolarization.

In a practical implementation, diffuse scatter is often the result of attempts to eliminate hot spots. Because of the tendency for facets to lie parallel to the substrate with statistical surfaces, effort should be made to spoil the reflection in the specular direction. This can be done by increasing diffuse scatter, but it is at the expense of brightness and PCR. According to the present disclosure, the probability density function is engineered in such a way as to be uniform in the vicinity of the specular direction. This allows polarization preservation while at the same time increasing screen brightness.

Theatre Geometry and Polarization Change on Reflection

An important aspect of designing an optimized statistical surface is a full understanding of the range of geometries associated with cinema auditoriums. In modern projection booths, the projection lens is (nominally) centered horizontally with respect to the screen, but is typically located above-center vertically. This can range from zero to more than a half-screen offset. It is typical for the screen to have single-axis curvature (about the vertical) with a radius of curvature equal to (optimally) or exceeding the throw distance. This is in fact a requirement for SMPTE compliance when using a screen with gain above 1.3.

It is typical to find stadium seating in two sections, with the front section sloped at about 8-10°, and the larger rear section sloped at approximately 20-22°. The front section is typically curved (like the screen), while the rear section is typically rectangular. There are frequently additional seats added in the rows nearest the projector, which increases the effective width of the rear section. In a typical movie theatre, the average throw-ratio (ratio of throw distance to screen width) is approximately 1.8.

In terms of definitions, performance may be described for different observation positions from the viewpoint of the hypothetical "ideal viewer." The ideal viewer represents the seat location for which peak brightness of a white frame occurs at the center of the screen (when using a gain screen). Other positions of interest include the perimeter seats for which the system should perform satisfactorily. These perimeter seats define the diffusion locus, taken together with the other geometrical considerations discussed above.

Of twenty one cinema auditoriums randomly tested, the average vertical offset angle of an axial ray is approximately eight degrees down. The vertical offset biases the specular direction downward, which is beneficial for brightness with a gain screen. When designed properly, this places the ideal viewer in a central position of the seating. Conversely, with zero-offset, the optimum viewing location with a gain screen is at the projector, which is clearly not practical. Depending upon the projector offset and the angle associated with a desired ideal viewer, a bias in the diffusion angle may be built into the diffuser design, according to the present disclosure.

Worst-case viewing angles are associated with the perimeter seats (or for a subset of seats for which the system should perform adequately). These seats define the viewing locus. Under ideal circumstance for brightness and contrast, according to the present disclosure, no light is thrown outside of the diffusion locus. Moreover, optimized polarization contrast ratio requires that only single reflections occur within the diffusion locus. In the event that multiple reflections occur, they should preferably occur for reflection conditions outside of the diffusion locus.

FIGS. 6A and 6B are polar graphs 600 and 650 respectively illustrating exemplary polar plots for the viewing locus of a specific auditorium at different viewing positions. FIG. 6A shows a plot 602 representing the angle of the observation ray (in the global coordinate system), defined by tracing the perimeter of the screen in the front-left seat (e.g., viewing position 132 of FIG. 1). FIG. 6B represents the corresponding plot 652 for the rear-left seat (e.g., viewing position 134 of FIG. 1). In this case, the latter (652) is contained within the former (602). In a typical stadium seating arrangement, however, the rear seats define the portion of the locus corresponding to the bottom of the screen.

Figure 7:
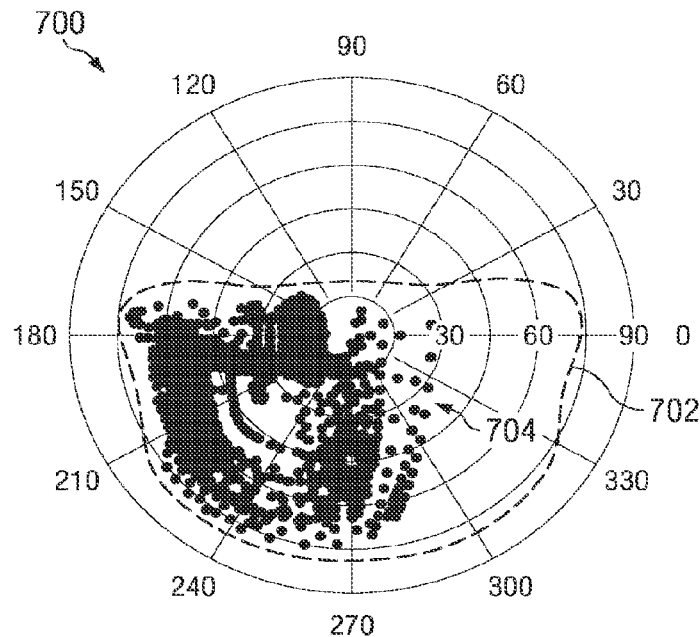
FIG. 7 is a polar graph illustrating the diffusion locus for a random sampling of theatre auditoriums, in accordance with the present disclosure.

FIG. 7 is a polar graph 700 showing the viewing locus, similar to those described above in FIGS. 6A and 6B, for a random sampling of twenty one theatre auditoriums. Such data 704 is contained within a perimeter 702, which, for illumination/viewing conditions symmetric about the vertical, defines a diffusion locus that is also symmetric about the vertical. It is a design objective to limit diffusion substantially within the region defined by perimeter 702, to include the viewing locus, which includes substantially all viewing positions plus an arbitrary margin of safety, e.g., five degrees.

In the following analysis, assume the screen to include a collection of micro-reflectors which, though virtually co-planar on a macroscopic scale, are randomly distributed in orientation in accordance with the slope-probability density function. A local coordinate system is defined here by a projection ray vector, and an observation ray vector. This defines a local plane of incidence, which contains the local facet normal vector (where a facet model is typically used for illustration, even though the desired surface may have continuous micro-reflective properties). Because polarization is substantially preserved by the screen, it is reasonable to assume that light deflected by the facet is the result of a specular reflection. The likelihood that a facet exists with the desired orientation is given by the two-dimensional slope probability density function, which is related to the screen gain.

The local plane of incidence also defines the local S and P vectors (or local eigenvectors), which obey Fresnel equations for reflection. In this case, the functional coating is typically a metal (e.g., aluminum), which has a complex refractive index, and therefore is absorptive. Assuming that the "facet area" is large with respect to the illuminating wavelength (or more realistically, that the slope is slowly varying on the scale of a wavelength) it can be considered that light specularly reflects from the surface, preserving polarization. As such, there is virtually no depolarization associated with the event, though a change in the state of polarization (SOP) in general occurs due to the distinct complex reflection coefficients associated with S and P.

Consider the specific case where incident linearly polarized light includes both S and P projections. A phase difference on reflection tends to induce ellipticity, while a difference in reflectivity tends to rotate the orientation. For a linear polarizer-based 3D system at the worst-case azimuth angle (polarization at ±45° to the facet plane of incidence), or a circular-polarizer based system at any azimuth angle, the contribution of Fresnel reflection to the polarization contrast ratio is given by $$PCR = \frac{\left(\sqrt{R_P}/2 + \sqrt{R_S}/2\right)^2 - \sqrt{R_P R_S}\sin^2(\Gamma/2)}{\left(\sqrt{R_P}/2 - \sqrt{R_S}/2\right)^2 + \sqrt{R_P R_S}\sin^2(\Gamma/2)}$$

where $\sqrt{R_P}e^{-i\Gamma/2}$ and $\sqrt{R_S}e^{i\Gamma/2}$ are the complex reflection coefficients associated with P and S polarizations, respectively (neglecting common phase), where $\Gamma$ is the phase shift between the R and P components. To first order, the first term in the denominator accounts for contrast loss due to reflectivity difference, while the second term in the denominator accounts for contrast loss due to phase retardation.

Fundamentally, the facet incidence angle should be less than 45°, having (e.g., a flat screen) infinite throw distance (with a centered projector) and a viewer located at the plane of the screen. More typically in theatre auditoriums, the maximum facet incidence angles associated with the worst case viewer are below 35°.

Figure 8:
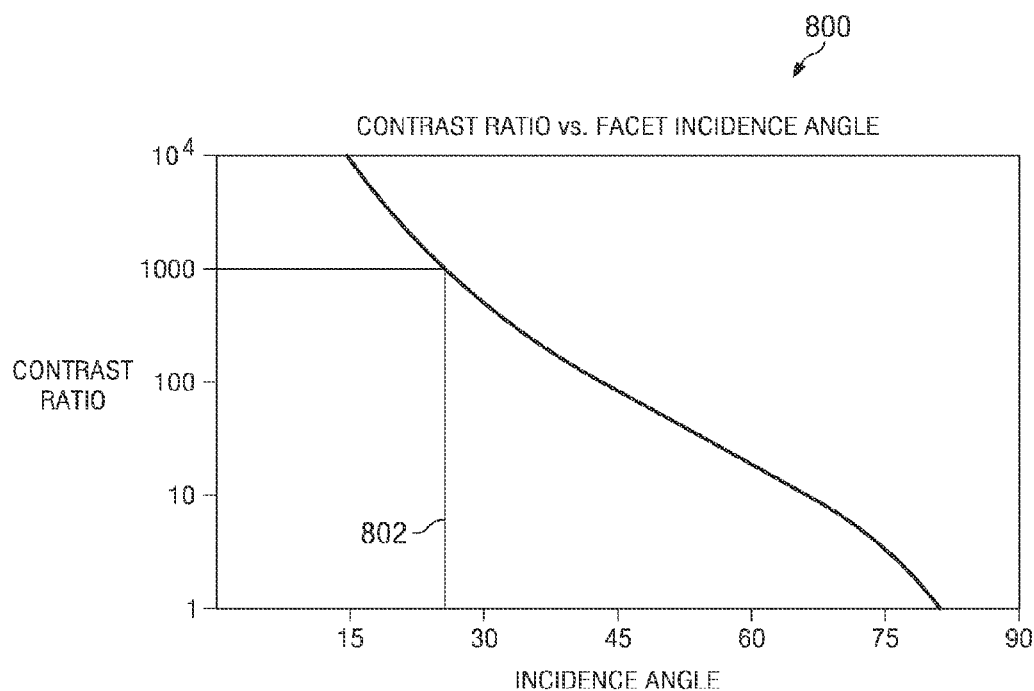
FIG. 8 is a graph of the contrast ratio for circular polarization or worst-case azimuth of linear polarization as a function of facet incidence angle, in accordance with the present disclosure.

FIG. 8 is a graph 800 of the Fresnel PCR for circular polarization (or worst-case azimuth of linear polarization) as a function of facet incidence angle. The contrast 802 is above 1,000:1 for angles below 25° (which accounts for most of the audience), remaining above 270:1 for angles out to 35°. As such, the Fresnel contribution is relatively small in present cinema environments.

In terms of relative contributions (again to first order), the contrast due to reflectivity difference alone is 24,000:1 at 35°, while the contrast associated with retardation alone is 273:1. Thus, the loss in contrast associated with Fresnel is mostly due to phase shift between S and P. The opportunity exists to more closely match phase of S and P, while increasing overall reflectivity by adding conformal transparent dielectric layers (that at the same time serve to prevent the growth of native oxide) over the metal. This is typically done with so-called "protected aluminum" mirror coatings. Lippey et al., in U.S. Pat. No. 7,110,175 (herein incorporated by reference) discloses the deposition of an aluminum layer to address the reflectivity difference by using a dielectric layer to make the reflectivity of S— and P— the same. However, Lippy fails to recognize that contrast is impacted far more by phase difference than the reflectivity difference. Because depolarization is assumed to be only a consequence of difference between S and P reflectivity, the natural objective for contrast is to minimize the local incidence angles, and thus to have higher gain. However, as disclosed herein, we have demonstrated that the dominant depolarization mechanism is multiple scattering events, which Lippey does not even mention. In other words, Lippey does not recognize the dominant mechanism that contributes to contrast performance or the techniques for such optimization of contrast performance. Furthermore, the second objective identified by Lippey is to match the amplitude reflectivity of S and P polarizations. However, with the teachings of the present disclosure, it is possible to both match the amplitude of S and P reflectivities and maximize the phase difference between the two components, thereby providing superior performance in polarization preservation properties.

Frequently, dielectric overcoats are deposited onto metal mirrors to provide durability and enhance reflectivity. If bare aluminum is not coated, it is easily scratched and will eventually form a thin layer (70-90 Å) of native oxide ($Al_2O_3$). Native oxide (index n=1.66) will tend to reduce reflectivity over time. If instead, a layer which is approximately a quarter-wave in optical thickness of MgF, (n=1.38) is deposited onto the bare aluminum, reflectivity can be made to increase by a few percent. While $MgF_2$ represents an ideal choice of dielectric overcoat, substantial improvement can be obtained using other low index dielectrics such as $SiO_2$. In both cases, the primary constraint is to minimize the complex phase difference between the S and P reflectivities.

In the present disclosure, polarization preservation is likely more important than increasing efficiency. As discussed above, reducing the phase difference between S and P components through thin-film compensation helps preserve polarization. A dielectric film of arbitrary thickness and index, with the performance metric being the PCR at 589 nm (where the input polarization is at 45° to the plane of incidence), produces the best results when the refractive index is minimized (e.g., with $MgF_2$). When a native oxide of 70 Å thickness is used, the PCR at a facet incidence angle of 35° is 139:1 (which is lower than bare aluminum). Adding a 0.34 wave thickness layer of $MgF_2$, yields a contrast of 23,915:1. At 28° the contrast is lower for the compensated case (1,934:1), but still, the contrast remains significantly higher than the uncompensated case (360:1). For smaller angles, contrast generally increases, but the compensated case remains at least a factor of three larger than the uncompensated case.

Because a tilted facet has linear eigenpolarizations, performance of a system based on linear polarization is azimuth dependent. If the input polarization is contained in the facet plane of incidence, then polarization is preserved on reflection. If this mechanism is important in determining contrast, then eyewear can be selected to optimize overall performance. For instance, screen corners tend to correspond to the largest facet incidence angles, which may tend to be closer to the ±45° azimuth angle than the 0/90° azimuth. In these circumstances, a system based on ±45° linear polarization eyewear may be used. As for systems using a circular basis, there is no relief from polarization change on reflection for any azimuth because, in fact, the contrast is independent of azimuth angle. In the event that contrast is dominated by multiple reflections, then the above argument may not be a relevant design consideration.

Double Reflections

Depending upon the screen structure, polarization change after a single reflection may not be the most important factor influencing cross-talk. Highly directional diffusers, such as those manufactured by Wavefront Technologies, have highly sloped ridges which tend to produce secondary reflections. Under the crossed-polarizing microscope, off-the-shelf holographic diffusers typically exhibit linear eigenpolarizations due to retroreflections when illuminated and detected normally. In a test of three samples of products normally used in transmission, but coated with aluminum for the test, all samples dispersed substantially more in one dimension than the orthogonal direction (8°/21°, 10°/68°, 12°/44°. The coated samples verified that contrast was several hundred to one when the input polarization was parallel to the structure axis, but was substantially lower when the sample was rotated, with contrasts of only tens to one in the 45° azimuth. Note that these measurements were made in a retroreflecting arrangement.

Statistical surfaces, such as metal-flake screens, are also prone to double-reflections. Often, the mean-free path between pairs of facets is substantially larger than the actual reflecting feature sizes. When a screen sample is rotated under a crossed linear polarizer microscope in a retroreflecting arrangement, the brightness of facet pairs can be observed to change in unison. This is likely due to polarization-converted light emerging from opposing propagation directions. Along the eigendirections, the pairs are highly extinguished. Due to the high degree of polarization conversion with retroreflection, the pairs become very bright in the ±45° azimuth. The effective geometry of the pairs is often very similar (dictated by the overlap area of the facets), which is another factor that makes them easily identifiable.

Retroreflecting arrangements have potential benefits from a brightness standpoint. That is, if the direction of peak diffusion is, in general, counter to the incident direction, then light from the projector will have a greater tendency to be thrown toward the audience. Beaded screens, for example, can have the benefit of functioning like a cat's-eye retroreflector. Because they have a self-correction property, retroreflectors can virtually eliminate the need for local control of diffusion properties as a means of optimally dispersing the light. However, care should be taken to ensure that such retroreflections do not compromise polarization, as would occur with certain (e.g., corner-cube) retroreflectors. In the case of double reflections from facet-pairs, polarization is substantially converted to the orthogonal state.

In the past, lenticular-like periodic structures have been used on cinema screens to disperse more in the horizontal direction relative to the vertical. In the event that structured surfaces are used to disperse light to a greater degree in the horizontal than the vertical, which are prone to secondary reflections, a system based on 0/90° polarization eyewear may be used. More likely, however, screen structures that are prone to secondary reflections will not perform adequately.

Contribution of Each Term to PCR

Specific measurements can be used to extract the contribution of each physical mechanism to the PCR. Based on the above discussion, the diffuse scatter term is likely to be white in angle space, and independent of polarization basis vector. This is the background leakage term. As such, PCR results versus facet incidence angle should be the same for both linear and circular polarizations. If not, then another physical mechanism is likely to be contributing significantly.

The Fresnel contribution is zero in the retroreflecting direction (for single reflections), becoming significant as the facet incidence angle approaches 20°, and growing as angle increases. It is clearly polarization dependent, vanishing when the input is parallel/perpendicular to the facet plane of incidence, and maximum at ±45°. The contribution to PCR is independent of azimuth when using circular polarization. Thus, if linear PCR results are a strong function of azimuth (or if there is a significant difference between linear and circular PCR) at large incidence angles, then the Fresnel term may be important. This assumes that the contribution from multiple reflections becomes relatively insignificant at such large angles (or is separable).

In the event that linear and circular basis vectors give different PCR in the retroreflecting direction, the reason is likely double reflection. With a statistical surface, where the slope probability density is uniform in azimuth, the likelihood of a double reflection event is likewise uniform in azimuth. For circular polarization, the contribution to PCR is therefore also uniform in azimuth. But because of the azimuth dependence of linear polarization, the contribution to PCR averaged over the entire azimuth is half that of the circular case.

As a way to test this contribution, polarization sensitive BRDF measurements were made for both linear and circular cases, where the linear case is along an Eigen-direction.

Figure 9:
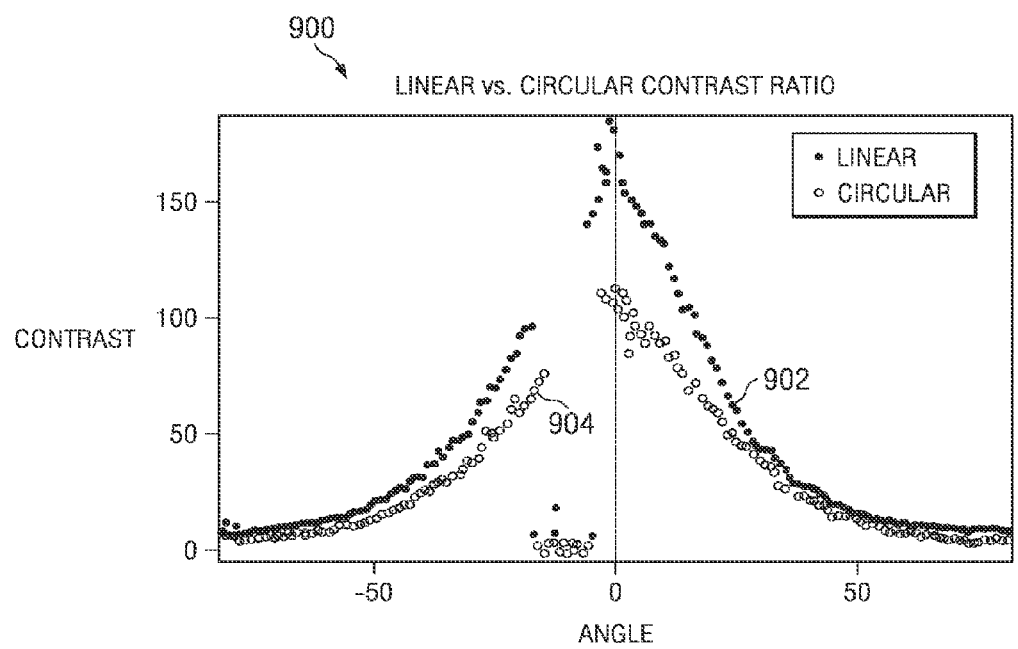
FIG. 9 is a graph illustrating the differences between contrast ratio for linear and circular polarizations, in accordance with the present disclosure.

FIG. 9 is a graph showing that the contrast of the linear case 902 is over 160:1, where the circular case 904 is only 110:1. Because this difference is observed along the retroreflecting direction, any difference in PCR may be attributed to multiple reflections, unless the PCR of the circular case is inherently lower. To obtain these results, a 532 nm laser was directed through a pair of orthogonal linear and circular polarizers to test the baseline performance at normal incidence. The baseline PCR was measured to be 888:1 for the linear case and 895:1 for the circular case, the difference of which is well within experimental error and limited by the polarizer. Thus, substantially higher PCR may be provided by the engineered surface of the present disclosure through the elimination of double reflections.

Another objectionable aspect of statistical surfaces is the lack of spatial control of BRDF characteristics. Spatial variation in the facet probability density function can produce a non-uniform appearance. The feature size associated with such variations may be highly dependent upon the manufacturing processes and the statistical control aspects of each. Given that the size of a pixel on an average screen for a full-HD (1024×2048 pixel) 2 k projector is roughly 7 mm, significant variation in reflected intensity over this (or larger) sizes is likely problematic. To demonstrate this, a screen sample was illuminated normally at a distance of 305 mm, with an amplitude stable 532 nm laser. The laser and detection module were mounted with a separation of 45 mm on the same rail carrier (in-plane), and were translated in 1 mm increments along the screen axis. The detector aperture is 5 mm, virtually eliminating the contribution of speckle. Some smoothing of the profile is assumed to occur as a consequence of averaging over the associated detection solid angle.

The total scan range in a particular position was 100 mm, with no significant difference in results for other positions on the screen. Screen samples from two vendors were tested. For Samples A and B, the standard deviation in reflected power was 6.8% and 5.2% respectively. The maximum deviation was +21% and −16% for Sample A, and +11% and −14% for Sample B.

An estimate of variation in perceived brightness of pixels, due to non-uniform BRDF, is obtained by comparing the average power collected in 7 mm segments of the scan. For Sample A, the average deviation was 4.6%, while for Sample B the average deviation was 6.7%. The corresponding maximum deviation was 8% and 7.5%, respectively. A benefit of the engineered surface according to the present disclosure is that such fixed-pattern variations could be virtually eliminated at all relevant scales.

Interference Effects

After propagation from the projector to the screen, and assuming spatial coherence of projection light on the order of a wavelength, the illumination light can exhibit spatial coherence over areas that are significant relative to the screen resolution area. This can exacerbate screen appearance uniformity problems via coherent superposition on the retina. According to the present disclosure, the engineered microstructrure can have a spatial frequency noise structure superimposed on the desired topography. Such a structure does not impact the single-reflection requirement, but randomizes the phase in such a way that light collected by the eye contains a substantially uniform representation in phase space. If the amplitude of the noise is some multiple of a wavelength and the wavelength is similar to the spatial coherence length of the light, then the phase randomization should be sufficient to substantially reduce speckle.

Matte Appearance

The eye resolves approximately one arc minute below which the perceived intensity can be considered a weighted integration of the probability density that generating kernels scatter from the illumination direction into the observation direction over the associated area. This probability is related to the local slope probability density. In the event that the integrated probability varies spatially, meaning that the sampled area does not conform to ensemble statistics, the screen will have a grainy texture, which is objectionable. This can happen both as a consequence of large feature sizes, as well as their specific distribution over the screen surface. Often, the relative intensity fluctuations increase with observation angle, where the probability that the required slope area exists is substantially diminished relative to the specular direction.

In conventional cinema screens, a matte appearance is the result of very small features, which produce multiple scattering events that contribute to an averaging in angle space. According to the present disclosure, the engineered diffuser is analyzed and modified spatially to create more uniform intensity distribution after single reflections. This substantially reduces the graininess of the appearance while preserving the polarization. To a large extent, this is accomplished by the engineered diffuser shape in accordance with the present disclosure. Locally, each scattering feature fills the entire viewing locus ergodically. Spatial fluctuations are due mainly to randomization and tiling effects. The percentage of area subject to such effects can be small relative to the unaffected region, i.e., it can be limited to regions where the engineered generating kernels are overlapping. By using generating kernels with zero slope and zero height at the boundary, this effect is substantially limited to the specular region of the gain profile where it is much less objectionable.

Exemplary Screen Designs

In the event that the screen contains a statistically homogeneous distribution of generating kernels, it is necessary that such kernels substantially satisfy the extreme conditions of illumination and observation. Every point on the screen accepts illumination from one (or more) discrete angles. Over the areas associated with ensemble statistics, this illumination can typically be considered collimated. For each such illumination area, light should be scattered into a range of angles associated with the diffusion locus, subject to gain requirements. For each such point, an important quantity is the extreme angle formed between the specular direction and the observation direction. When the scatter requirements for each point of the screen are overlaid, the perimeter, termed here as the "diffusion locus" defines the screen microstructure diffusion requirements. The diffusion locus is related to the slope probability density of the screen microstructure.

When describing a microstructured diffuser, it is convenient to consider the smallest fundamental structural unit (or units) that is replicated to form a macrostructure. This structure is referred to herein as the generating kernel, and for a surface diffuser it will have some topographical shape that determines the diffusion profile of light reflected off of it. In an ideal situation, this generating kernel carries the entire ensemble statistics of the required diffuser so that point-to-point variation in the diffusion are minimized at the smallest possible scale. In a more general case, the generating kernel may not fully satisfy these statistics, but an ensemble of such structures may.

An aspect of the present disclosure is to design the profile of a generating kernel (or microstructure comprising a plurality of generating kernels) to eliminate secondary reflections within the facet incidence angles associated with the full range of illumination/observation angles. In one embodiment, this is accomplished by determining the diffusion locus of illumination/observation to provide light to all required seats in the auditorium (based on the geometrical considerations discussed previously) and designing a generating kernel (or microstructure comprising a plurality of generating kernels) that achieves at least one of the following: (1) a slope probability density function that is uniform throughout the diffusion locus (virtually Lambertian), with little, if not no, "spike" in the specular direction; (2) a slope probability density function that is uniform spatially (e.g., ±1%) so that there is little, if not no, perceived modulation in brightness; (3) a slope probability density function that has a sharp cutoff in angle space at the perimeter of the diffusion locus; (4) a generating kernel layout that is free of features smaller than a few microns, such smoothness ensuring that the degree of polarization is preserved; (5) generating kernel feature sizes that are smaller than several hundred microns (which could result in e.g. "grainy" or "sparkle" appearance); and (6) rays incident within the perimeter of the diffusion locus do not undergo any substantial secondary reflections before entering the diffusion locus.

By providing a sharp cutoff in the slope probability density, it is possible to eliminate rays that tend to scatter in the direction of incident light (forward scatter), or adjacent structures. Such light will undergo two or more reflections, generally with significant change in polarization. Additionally, light that would otherwise not enter the diffusion locus can be used to increase image brightness, and eliminate loss in color saturation and contrast resulting from stray light scattered from auditorium surfaces.

Figure 10:
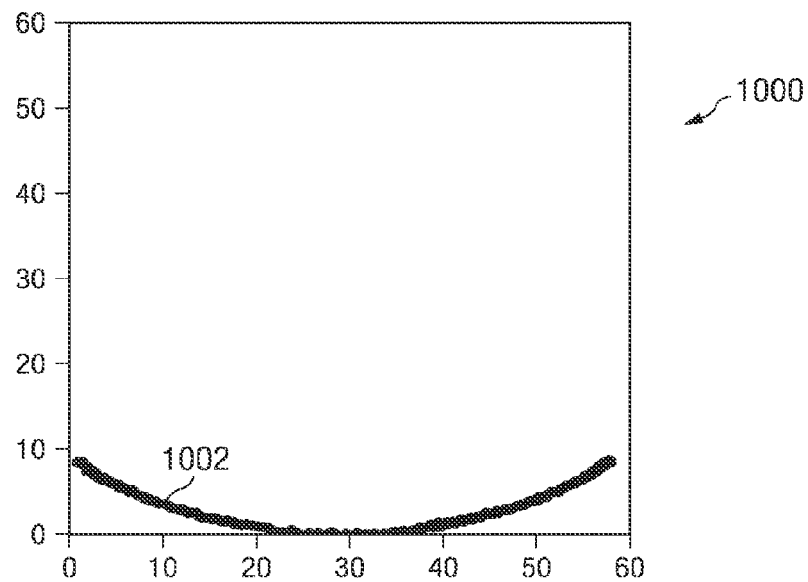
FIG. 10 is a graph of a concave structure with a uniform probability density function, in accordance with the present disclosure.

FIG. 10 is a graph 1000 of a one-dimensional example of a concave structure 1002 which has a uniform probability density function with a hard cutoff at 80°. Mathematically, the requirements for such a structure are as follows. First, the rate of change of θ is proportional to the inverse of the desired scattering probability, $\mathcal{D}(\theta)$: $\partial\theta/\partial x = c1/\mathcal{D}(\theta)$ (where c has units of inverse distance and sets the scale for the generating kernels). Second, the hard cutoff in the probability distribution is determined by setting the limits of integration of θ. Finally, the slope at any point on the surface is equal to the tangent of half the scattering angle: $\partial z/\partial x = \text{Tan}(\theta/2)$.

Figure 11:
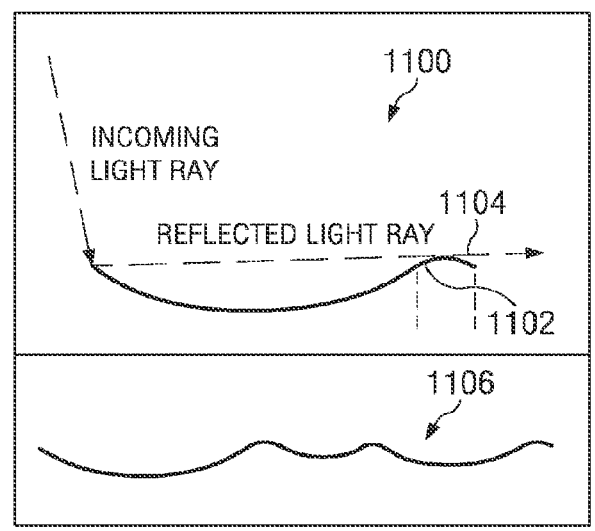
FIG. 11 is a schematic diagram of a periodic structure with a uniform probability density function, in accordance with the present disclosure.

FIG. 11 is a diagram illustrating a 1D structure 1100 which is both periodic and satisfies the same criteria. The convex elements 1102 in the structure are obtained by rotating the concave elements by 180°. Adjacent cells in the structure may have arbitrary size as long as the aspect ratio is preserved, the size remains small enough to be visibly irresolvable but large enough to prevent diffuse scatter (e.g. less than several hundred microns and greater than a couple of microns), and no multiple reflections occur within the diffusion locus. Light incident at angles up to 10° suffer no multiple reflections as shown by reflected ray 1104, which clears the adjacent peak. A randomized surface may be generated by tiling multiple unit cells with different widths as shown in 1106.

More generally, a statistical surface can be generated by eliminating the differential equation, $\partial\theta/\partial x = c1/\mathcal{D}(\theta)$, but maintaining the slope probability density, $\mathcal{D}(\theta)$. Reflecting structures may have different shapes as long as the density of surface elements with slope $\theta$ is equal to $\mathcal{D}(\theta)$. In particular, this allows the design to accommodate different scattering requirements in different regions of the screen.

FIGS. 12A-12D are schematic diagrams showing a side view of an arbitrary theater including the projector, screen, and seating area.

Figure 12A:
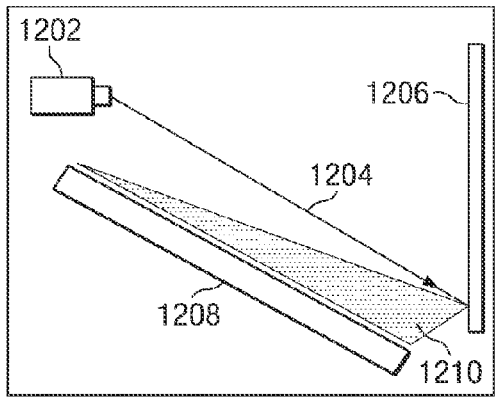
FIG. 12A-12D are schematic diagrams of a side view of a theater with a projector, screen, and seating area, in accordance with the present disclosure.

In FIG. 12A, in operation, ray 1204 travels from the projector 1202 to the bottom part of the screen 1206. In order to illuminate the seating area 1208, it should be scattered into the diffusion locus 1210. The diffusion locus is defined in accordance with the angular extremes in illumination and detection/observation. Within the diffusion locus, substantially only single reflections occur from the screen toward the diffusion locus; whereas outside the diffusion locus, multiple reflections may occur.

Figure 12B:
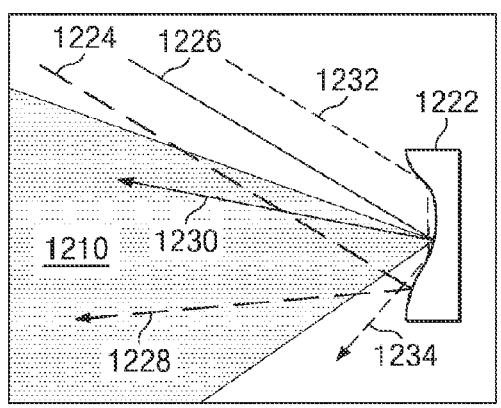

FIG. 12B is a schematic diagram showing an example microstructure 1222 at the screen surface in FIG. 12A. Rays 1224, 1226, and 1232 are all approximately parallel to ray 1204 but illuminate different parts of the microstructure. Rays 1224 and 1226 experience single specular reflections 1230 and 1228 before entering the diffusion locus 1210. Ray 1232 experiences two specular reflections but the exiting ray 1234 does not enter the diffusion locus 1210 and so will not likely cause a decrease in PCR.

Figure 12C:
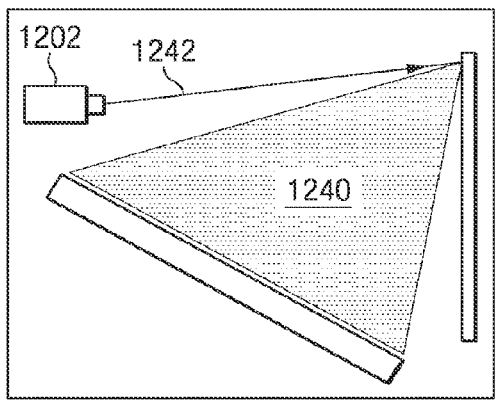
Figure 12D:
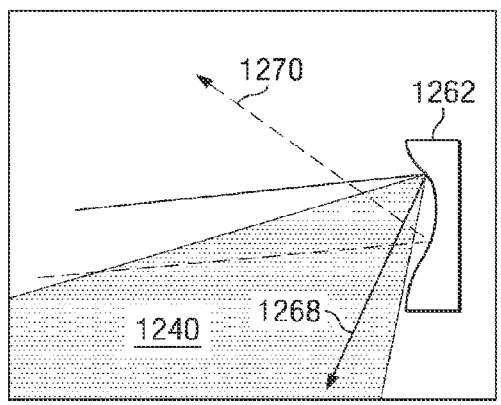

In contrast, FIG. 12C shows a ray traveling up from the projector to the top of the screen 1206 which illuminates a substantially different viewing location within the diffusion locus. FIG. 12D illustrates reflections 1268 from a microstructure 1262 located at the top of screen 1206 showing that no rays incident on the top part of the screen experience multiple reflections although some reflected rays 1270 do not enter the diffusion locus 1240.

Thus, compared to rays traveling up from the projector 1202 to the top of the screen 1206, rays traveling down from the projector 1202 and impinging on the bottom part of the screen 1206 should preferably scatter into a substantially different portion of the diffusion locus in order to illuminate the seating area, i.e., the slope probability density is also a function of incident angle. Furthermore, because different incident angles illuminate different viewing locations, some double reflections may be tolerated as long as they result in light that does not enter the diffusion locus. These effects increase as the throw of the projector is decreased. Although a single microstructure 1222, 1262 is shown, consistent with the present disclosure, a single microstructure may be comprised of one or more generating kernels.

Figure 13A:
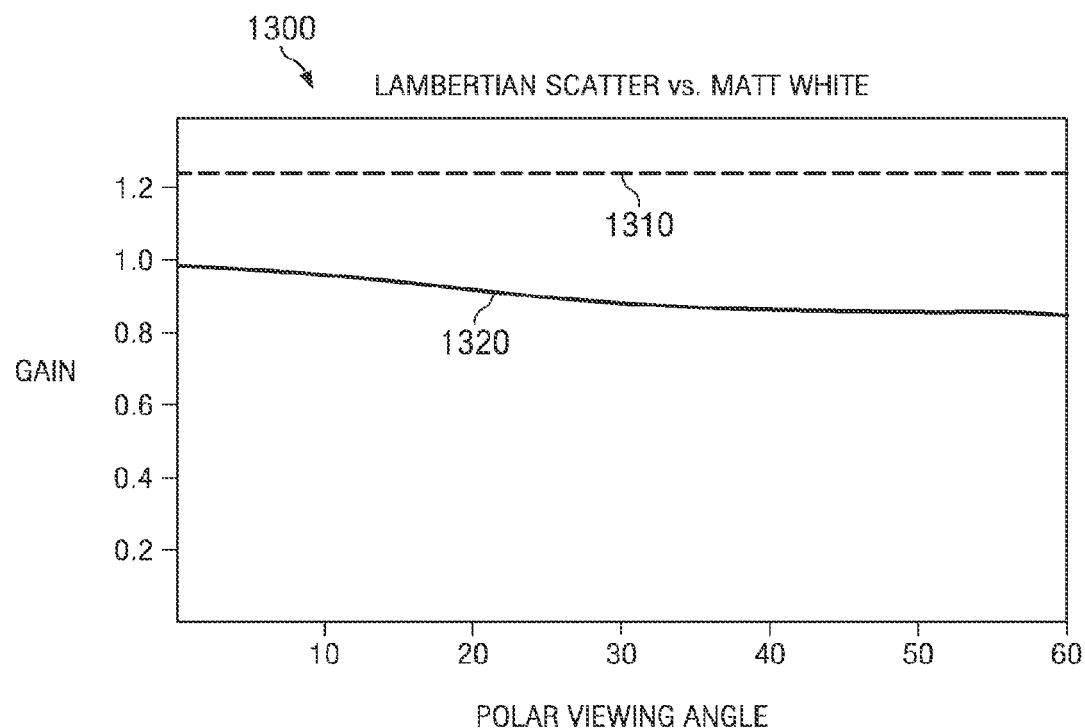
FIGS. 13A-13B are graphs of exemplary gain curves for engineered screens in which light is diffused into the diffusion locus, in accordance with the present disclosure.
Figure 13B:
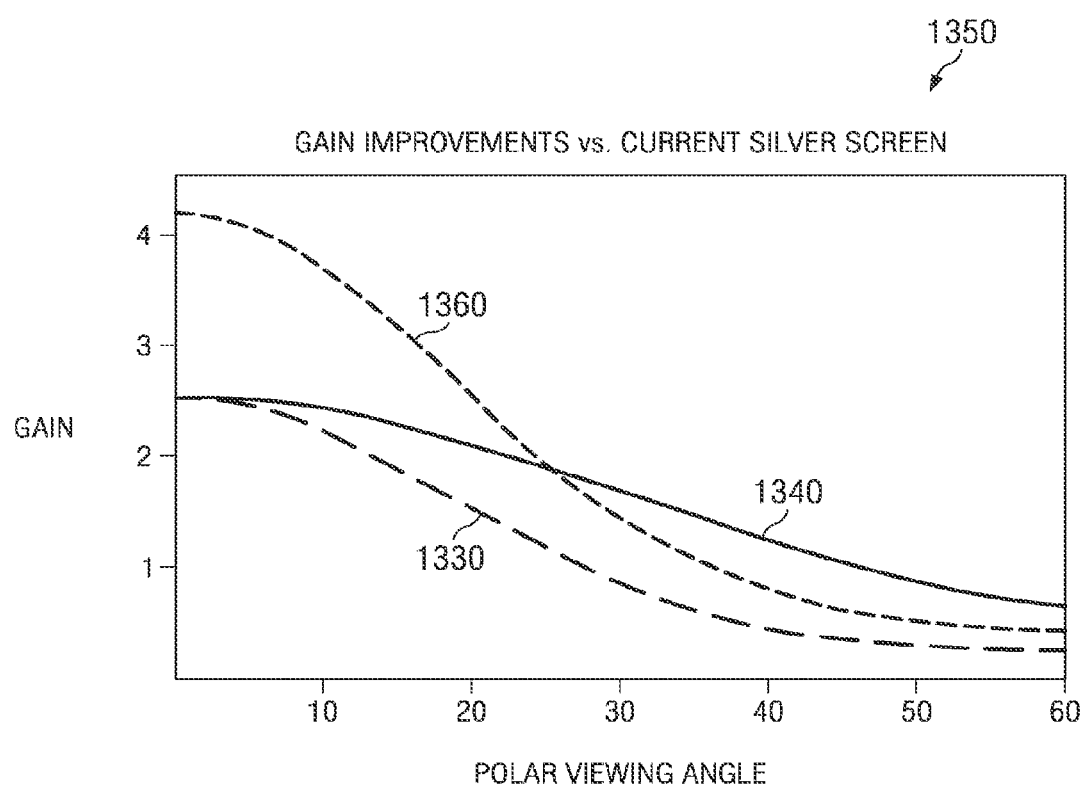

FIGS. 13A and 13B are graphs 1300, 1350 of several possible "gain" curves for engineered screens in which light is only scattered into the diffusion locus shown in FIG. 7. Here, the gain is calculated within the diffusion locus and is assumed to be symmetric about the vertical axis, but with a sharp cutoff, as shown in FIG. 7. Graph 1300 illustrates that a uniform (Lambertian-like) profile 1310 within the diffusion locus would result in an efficiency increase of almost 30% over a typical matte white screen profile 1320. Graph 1350 illustrates that if the gain profile has the same functional shape as the existing gain silver screen, the increase in efficiency 1360 is almost 100%. Alternatively, the gain curve can be flattened, shown by line 1340, such that the overall uniformity is better than the conventional silver screen, shown by line 1330, i.e., widen the gain profile of the current silver screen, with substantially the same maximum brightness.

Figure 14:
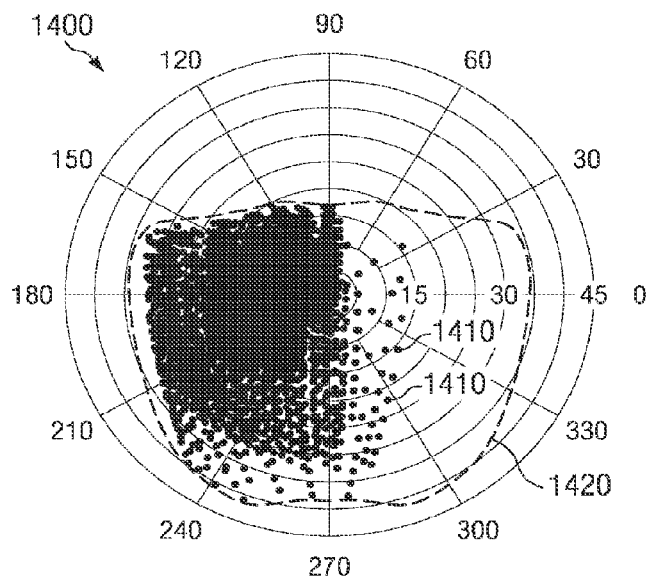
FIG. 14 is a polar plot of a facet-normal locus, relative to the screen surface normal, that substantially illuminates the entire viewing region with light from the projector, in accordance with the present disclosure.

FIG. 14 is a polar plot 1400 of the facet-normal locus, relative to the screen surface normal, that substantially illuminates the entire viewing region with light from the projector. At each point on the screen, there is a set of facet normals 1410 that direct light from the projector to each individual seat. The union of all such sets across the surface of the screen defines the locus of facet normals 1420 to ensure that each viewer receives light from substantially all parts of the screen. Any facet normals falling outside this locus result in wasted light. The black dots 1410 are computed from the left side extreme-viewing-location seats from a random selection of theaters. The locus or curve 1420 is extended to encompass the viewing angles for the right-most seats as well.

The desired geometrical prbperties for a polarization preserving projection screen have been identified as: (1) Filling the diffusion locus with uniform light intensity; (2) Preventing multiple reflections of light by (a) introducing a cutoff angle in the light distribution to prevent reflected light from hitting the screen a second time and (b) keeping features with steep slopes well separated so that scattered light at large angles does not encounter a second surface; (3) Achieve ergodicity within a region smaller than a pixel. i.e., the full diffusion locus should be sampled uniformly by an area of the screen that is smaller than a pixel so that the screen intensity is spatially uniform; (4) Ensure that all features are significantly larger than an optical wavelength to prevent scatter; and (5) Avoid periodic structures that could combine with the pixilation of the projector to produce moiré, or interference between sets of fine pattern grids. A curve was found that satisfied these requirements for 1D scattering.

As used herein, "ergodicity" is the condition wherein the average value of some parameter over a finite region has converged to the ensemble average of the entire region. When a region of a certain size is said to be ergodic, it is not statistically different from any like-sized or larger region in the ensemble.

There are two general strategies to realize a 2D diffuser surface. The first is to determine a set of rules that can be used for random (stochastic) processes that on average satisfies the requirements. Identifying fully random processes that will in general satisfy all of the design requirements may be complicated, but the manufacturing of these surfaces may, in general, be easier. The second strategy is to design a custom structure that explicitly satisfies all of the above requirements. This ensures the best performance, but requires a manufacturing technique that can transfer this design to the screen surface with high fidelity.

Stochastic Design

There are a multitude of techniques available with which to make a surface diffuser from random structures. These include holographic recording of laser speckle, chemical etching, mechanical etching (e.g., bead blasting), and coating with metal flake encapsulated in polymer binder. The local geometry of the individual scattering features in these diffusers is defined by the process in which the diffuser is created. For example, a holographic diffuser will be composed of 2D Gaussian peaks whereas a metal flake paint will be composed of a collection of planar facets with sharp edges. Neglecting any sharp edges, the limit of a large number of such features is expected to conform to Gaussian statistics. Therefore, a stochastic diffuser may be approximated as a randomly distributed collection of Gaussian scattering features wherein the features have some characteristic height d, and width σ.

In principle, the mean values of d and σ can often be independently controlled. For example, for a laser speckle pattern, σ is the characteristic speckle size and can be adjusted by modifying the distance to the aperture or the size of the aperture. If the speckle pattern is recorded in photoresist, then d can be controlled by modifying the exposure time and/or the developing conditions. Similarly, in a bead-blasting process, σ will be related to the size of the ablating particles and d will be proportional to their incoming velocity (to first-order). Therefore, constructing design rules for the generation of stochastic diffusers depends on an understanding of the relationship between d, σ, and the preservation of polarization, i.e., double reflections.

Figure 15:
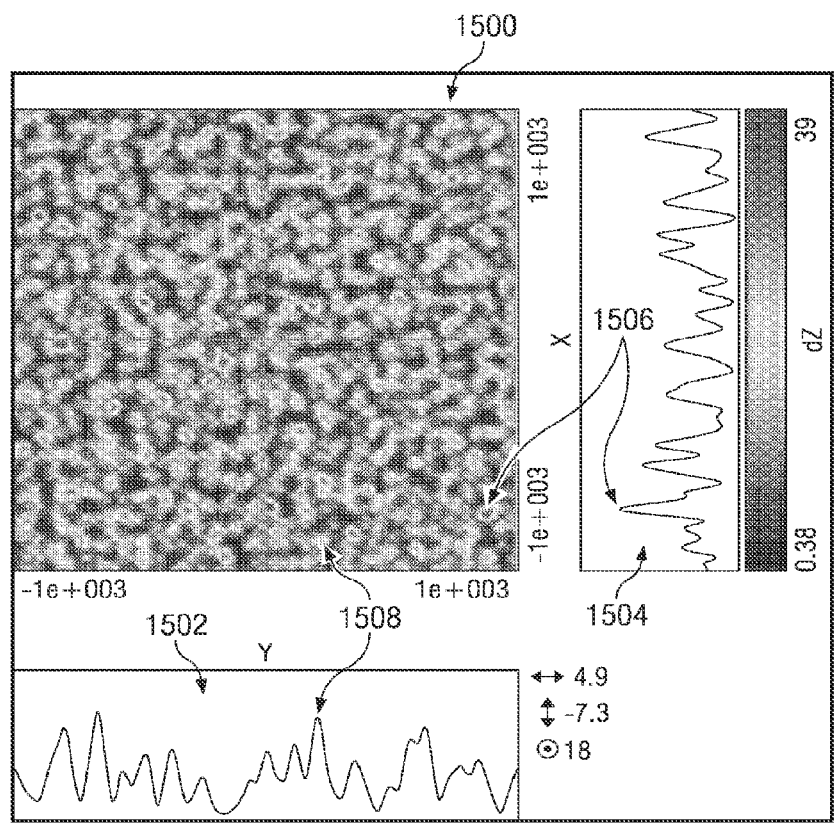
FIG. 15 is a graph illustrating an exemplary Gaussian surface, in accordance with the present disclosure.

FIG. 15 is a schematic diagram illustrating a top-down view 1500 of an exemplary Gaussian surface and respective side views 1502 and 1504 that have been simulated with Gaussian statistics to verify the computational model against experiments on physical samples. A 2D diffuser with Gaussian statistics is simulated by populating a plane with randomly positioned Gaussians (e.g., Gaussians 1506 and 1508). To first order, it is sufficient to use identical Gaussians (σ, d are constants). Relatively uniform coverage is provided by locating the peaks on a hexagonal lattice and then randomly translating their positions by a Gaussian weighted distance. If the standard deviation of the translation is sufficiently large then the underlying hexagonal order is erased and the pair-pair correlations become Gaussian. This results in a Gaussian noise distribution as shown in FIG. 15. In this exemplary simulation, σ=30 μm, d=16 μm, the underlying lattice constant is 60 μm and the total width of the structure is 2 mm.

The scattering distribution and gain of this structure 1500 was simulated using non-sequential ray tracing (ASAP) software. The illumination was a uniform collimated light source that fully sampled the surface at normal incidence. To speed computation and simplify the analysis, the polarization of individual rays was neglected and non-geometrical effects were ignored (e.g., Fresnel reflectivity, scattering from sub-wavelength features). To compute the gain, all of the rays that reflected from the surface only once were collected.

Figure 16:
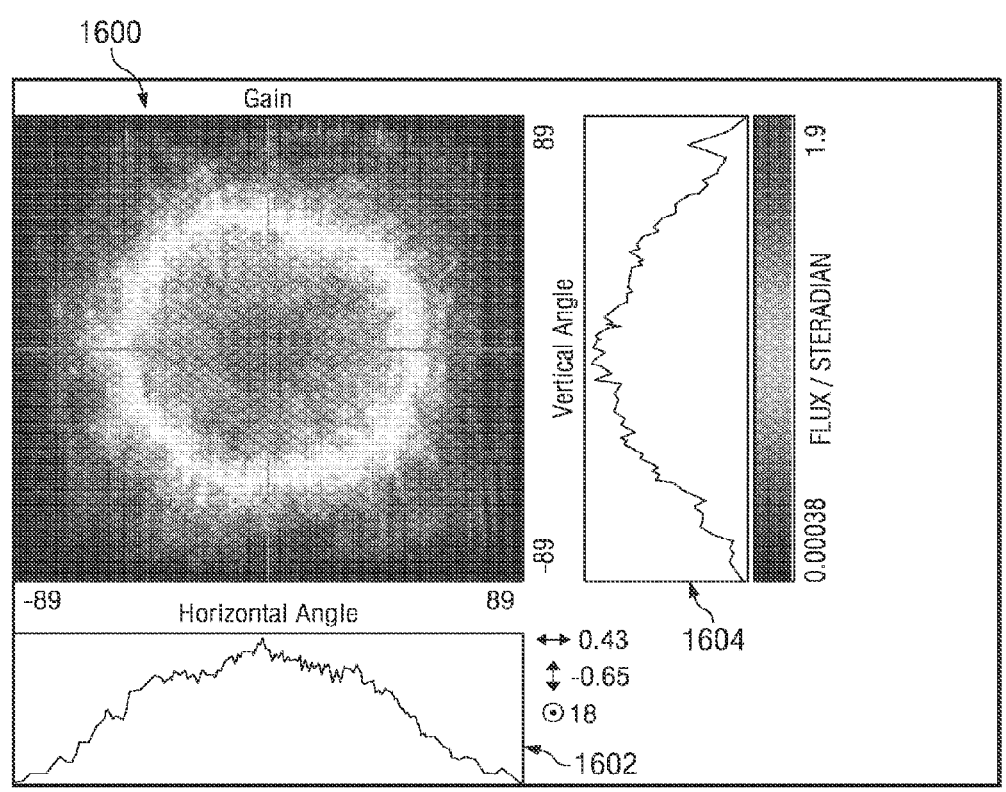
FIG. 16 is a graph illustrating density of rays reflected from an exemplary Gaussian surface, in accordance with the present disclosure.

FIG. 16 provides a graph 1600 illustrating the density of the rays reflected from the exemplary Gaussian surface of FIG. 15, plotted as a function of angle. Graph 1600 depicts this 2D ray trace as a Gaussian noise surface and graphs 1602 and 1604 illustrate the profile from horizontal and vertical aspects respectively. In graph 1600, the simulated rays have only reflected from the surface once and the intensity has been scaled by cos(θ) to show the gain. A gain plot of all of the rays that reflected from the surface twice can be used to compute the depolarization effect of multiple reflections.

Figure 17:
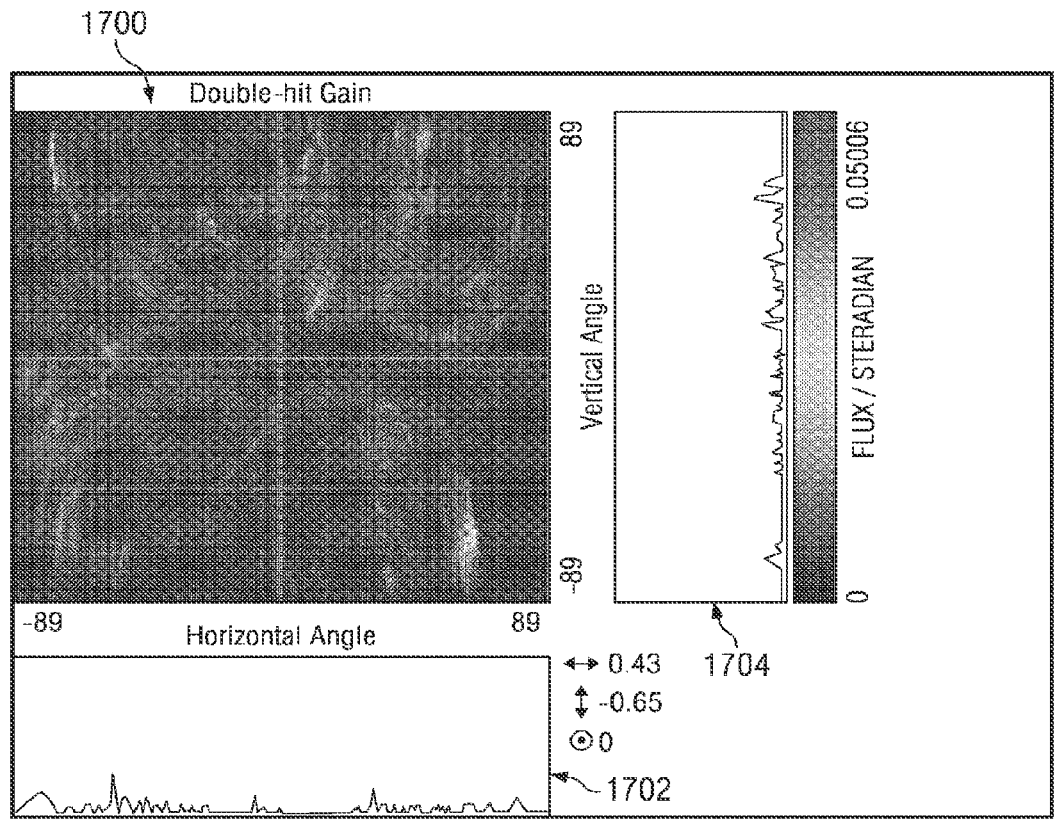
FIG. 17 is a graph illustrating an intensity plot of rays that experience double reflection from an exemplary Gaussian surface, in accordance with the present disclosure.

FIG. 17 provides a graph 1700 illustrating an intensity plot of rays that experienced a double reflection from the exemplary Gaussian surface of FIG. 15. Graph 1700 and side views 1702, 1704 reveal that the Gaussian surface is not fully ergodic, i.e., because the scattered distribution is not radially uniform this surface is not statistically smooth. This is consistent with experiments on holographic diffusers with similar feature sizes in which significant intensity variation is seen between adjacent 3 mm×3 mm patches. However, a radial average of the distribution is a good approximation of the full distribution. The polarization contrast ratio due to multiple reflections is the ratio of the intensity due to single reflections, as shown in FIG. 16, to the intensity due to double reflections, as shown in FIG. 17.

Figure 18:
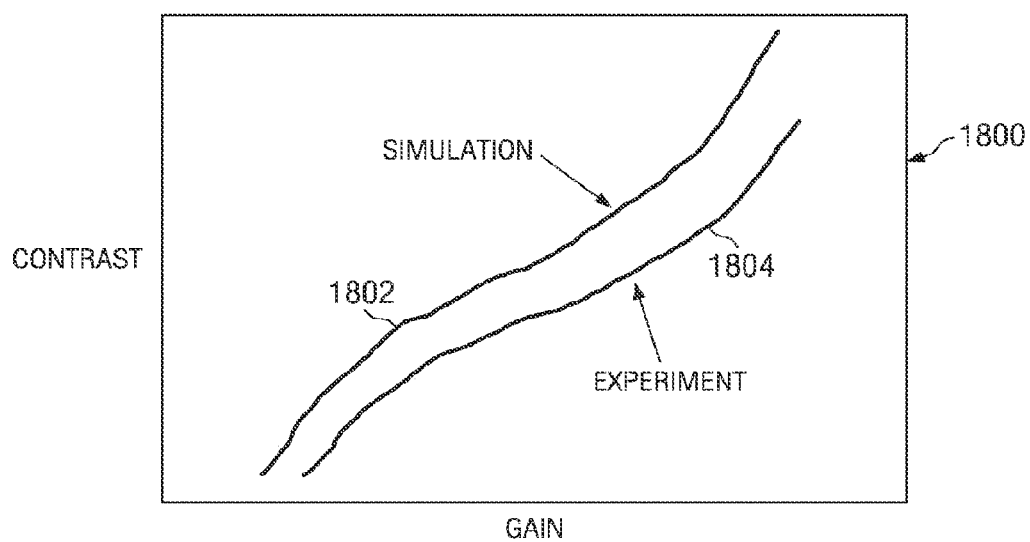
FIG. 18 is a graph illustrating contrast against gain for a series of simulations with different amplitudes for Gaussian diffuser surfaces, in accordance with the present disclosure.

FIG. 18 is a graph 1800 illustrating contrast against gain for a series of simulations with different amplitudes for Gaussian diffuser surfaces. By increasing the amplitude of the noise distribution, the gain of the structure is decreased. This increases the likelihood of multiple reflections and, as a result, the contrast decreases. The trend is qualitatively similar to trend measured on a series of holographic diffusers. The line 1802 showing the simulated result has consistently higher contrast than the line 1804 showing the experimental result due to the lack of point scattering, Fresnel effects, and finite polarization sensitivity of the measurement system. This series of experiments highlights some of the limitations of a statistical surface as a diffuser for a cinema screen. There is an intrinsic tradeoff in such structures between gain (and thus, illumination uniformity) and contrast. To the extent that high gain can be tolerated, higher contrast can be obtained. However, it should be noted that to achieve both high contrast and low gain requires a carefully engineered surface.

In order to diagnose these results, the scattering properties of a random surface may be calculated. Consider a Gaussian peak with height d and width σ.

$$z(r) = d e^{\frac{r^2}{\sigma^2}} \quad 1)$$

The maximum slope on this feature occurs at $$r = \frac{\sigma}{\sqrt{2}}$$

and gives rise to a reflection angle θ of $$\theta = 2\tan^{-1}\left(\frac{\sqrt{2}}{\sigma} d\, e^{-\frac{1}{2}}\right) \quad 2)$$

Therefore for a given feature height, a minimum feature width $\sigma_m$ can be set, such that for isolated scattering features, produces a cutoff angle $\theta_c$.

FIGS. 19A-19D provide schematic diagrams showing plots of reflection conditions for different spacings between Gaussian peaks. FIG. 19A is a schematic diagram showing a reflection of a ray 1904 off a single scattering feature 1902. For a single scattering feature, as long as $\theta_c$ is less than 90°, the reflected ray 1906 will be directed away from the surface and there will be no secondary reflection. FIG. 19B is a schematic diagram showing the reflective properties as adjacent features 1922 and 1924 get closer. However, as adjacent features 1922 and 1924 approach, there is some region in which for large reflection angles, a second reflection does occur. FIG. 19C is a schematic diagram showing the situation as the peaks 1932 and 1934 approach even more. Here, the double reflection disappears because the superposition of the two peaks decreases the maximum slope in the region between them. FIG. 19D is a schematic diagram showing the scenario of the two peaks 1942 and 1944 overlapping, such that the maximum slope is increased, which in many cases leads to a multiple reflection. Therefore, for adjacent Gaussian peaks, there exists a locus of regions in which multiple reflections occur.

Figure 20:
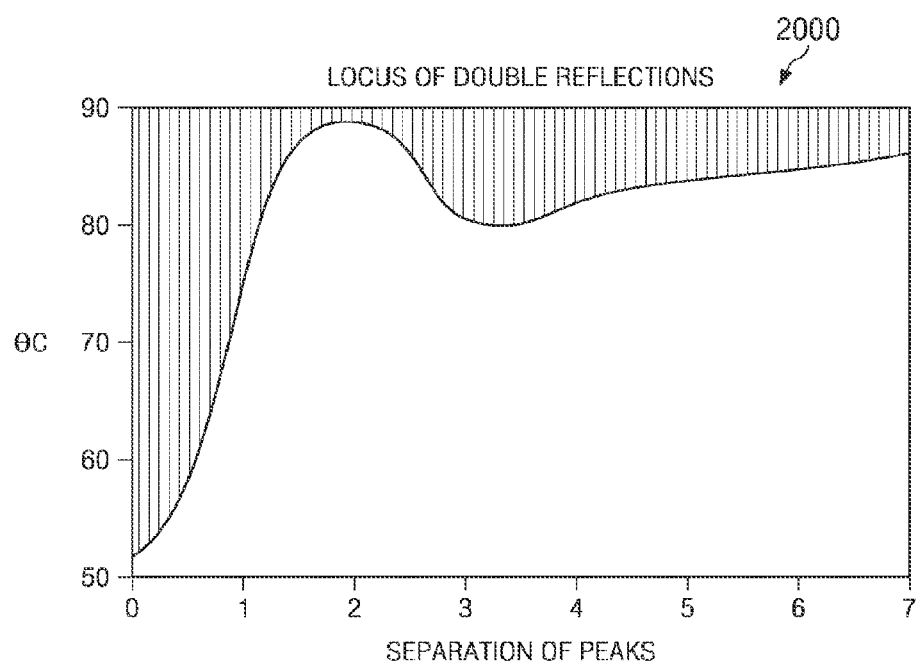
FIG. 20 is a graphic diagram illustrating a computed locus of separations for two Gaussian peaks in which no multiple reflections occur, in accordance with the present disclosure.

FIG. 20 is a graph 2000 illustrating that for two Gaussian peaks with equal height and cutoff angle $\theta_c$, there is a computed locus of separations in which no multiple reflections occur. In order for there to be zero (or close to zero) probability of a double reflection on the surface defined by the two peaks, $\theta_c$ of the Gaussian is preferably less than 52°. For $\theta_c$ less than 80°, no multiple reflections occur between the peaks, but this may occur as the peaks begin to overlap. Should the possibility of three peaks overlapping be considered, then $\theta_c$ would be smaller still. Unfortunately, $\theta_c$ is considerably smaller than the desired diffusion locus for a typical theater. Light will be scattered to larger angles as the peaks approach each other, but to use this behavior to fill the diffusion locus, one would need a high density of scattering features. In this case, the probability of more than two features overlapping increases drastically. In sum, an attempt to eliminate double reflections, by decreasing the $\theta_c$ to less than 52°, results in light not hitting the entire diffusion locus.

Figure 21A:
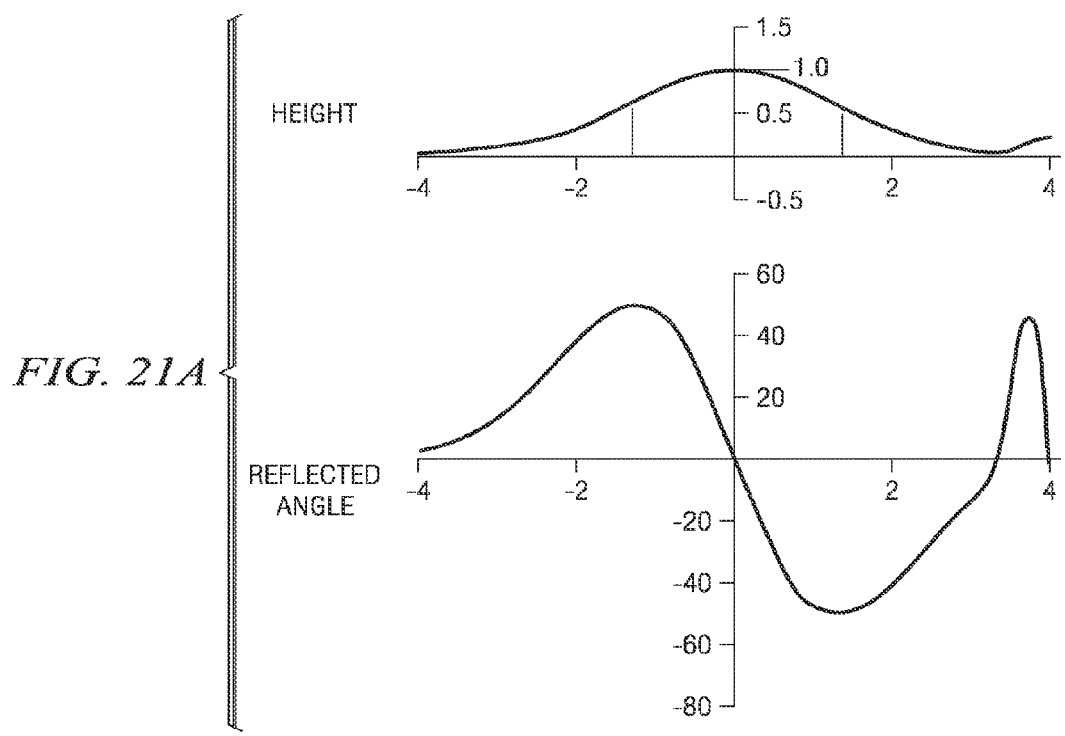
FIGS. 21A to 21C are schematic diagrams showing, in each case, the superposition of two Gaussian peaks with varying heights and widths, in accordance with the present disclosure.
Figure 21C:
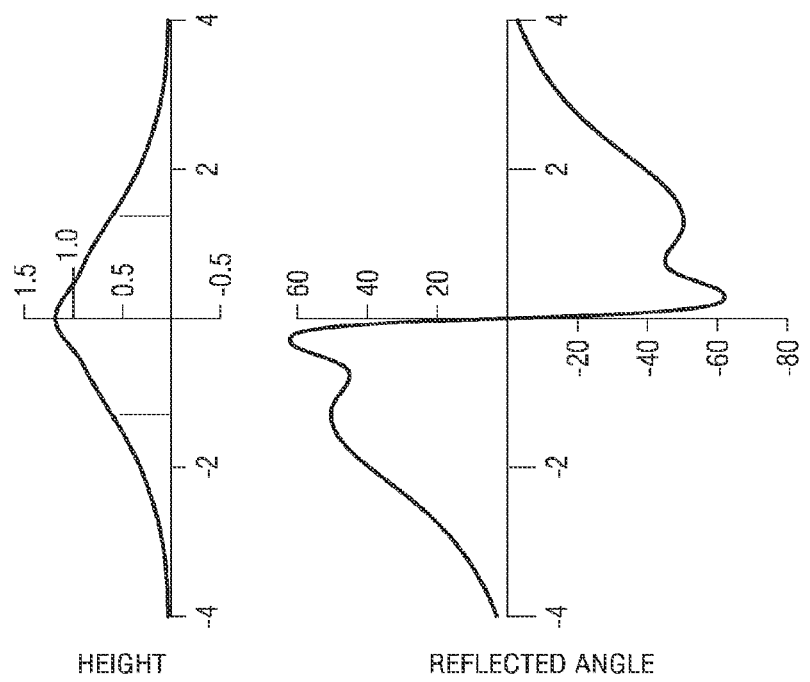
Figure 21B:
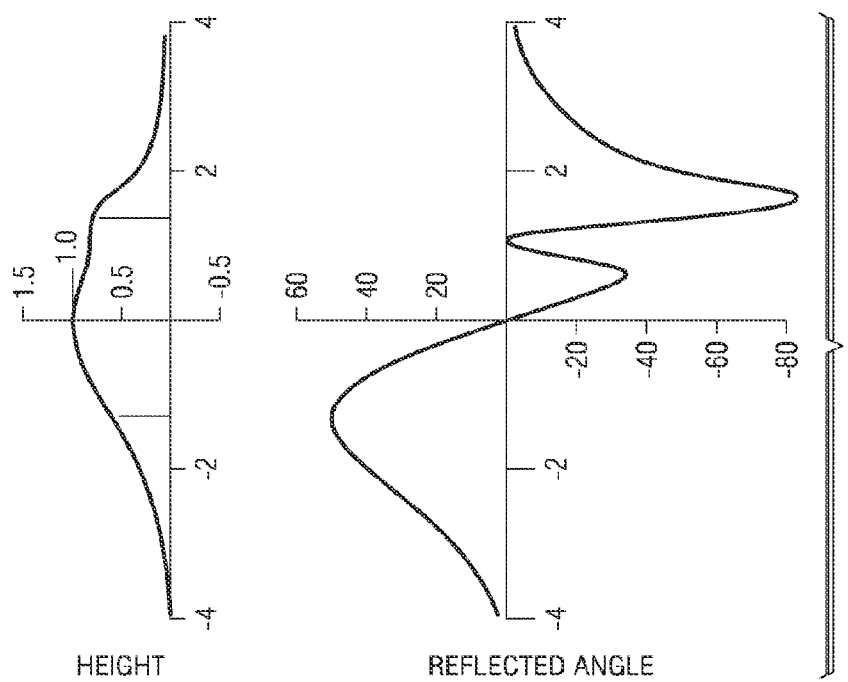

One way to solve the problem above is to use Gaussian peaks with different heights and widths. FIGS. 21A to 21C are schematic diagrams showing the superposition of two Gaussian peaks with $d_1=1$, $\sigma_1=1$ and $d_2=\frac{1}{5}$, $\sigma_2=\frac{1}{5}$. The reflected angle as a function of position is calculated for different peak-to-peak separations. When the peaks are well-separated (see, e.g. FIG. 21A), the reflection angle on the surface is locally that of the individual Gaussians ($\theta_c$=50). However, as the peaks approach, the maximum slope between them is enhanced. FIG. 21B shows the smaller peak is located approximately on the shoulder of the larger peak. The maximum slope then decreases as the peaks exactly overlap (see, e.g., FIG. 21C). The overall effect is similar to the superposition of equal sized features with one important difference: the same maximum slope condition is obtained but the average depth of the surface has not significantly increased. Consequently the large-angle scatters remain relatively well separated and the likelihood of a second reflection is smaller.

Figure 22:
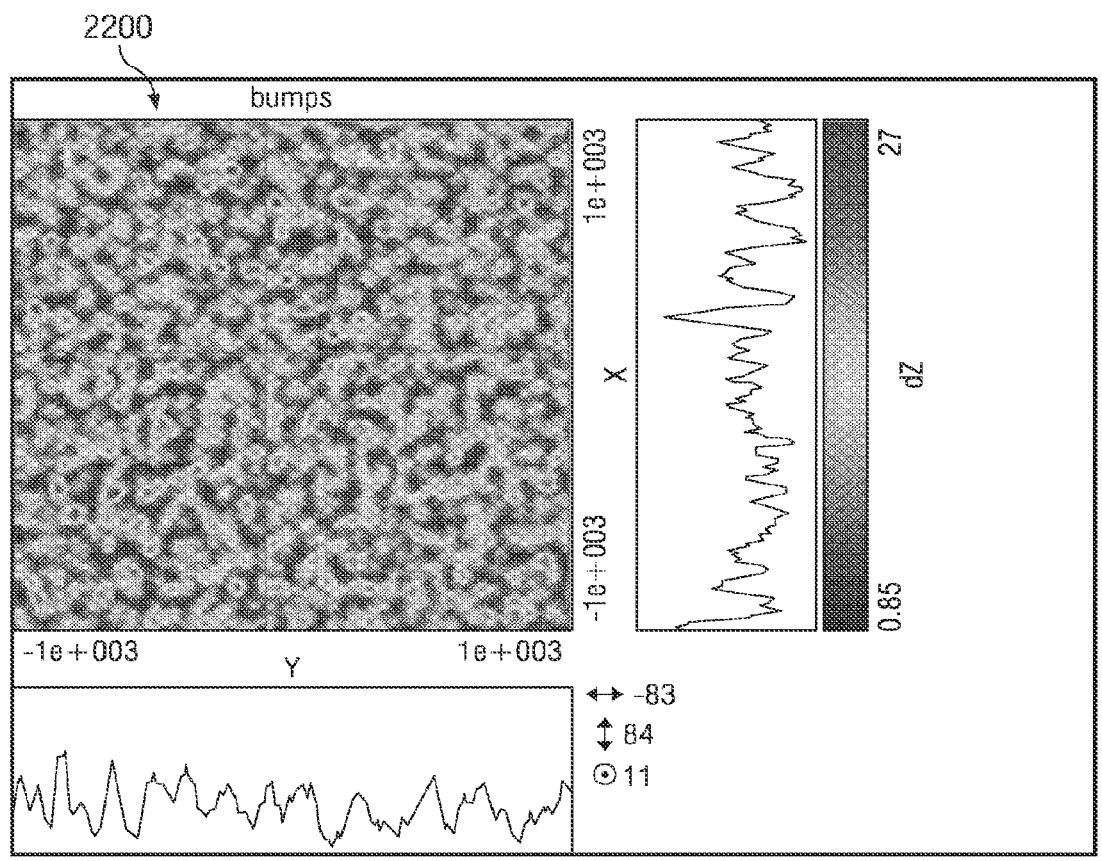
FIG. 22 is a graph of a simulated noise pattern, in accordance with the present disclosure.

FIG. 22 is a graph of a simulated noise pattern 2200 illustrating two patterns composed of structures with different height and width but substantially identical cutoff angle.

Figure 23A:
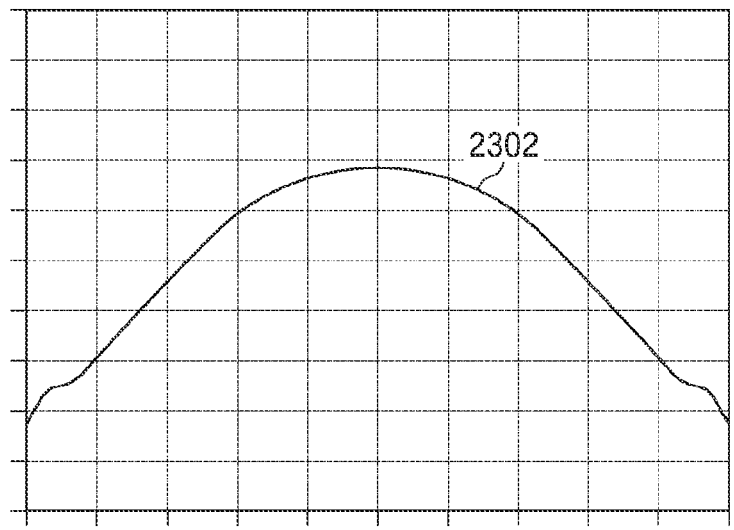
FIGS. 23A to 23D are graphs of the gains and contrasts of both a diffuser composed of two patterns and different characteristic sizes versus a diffuser composed of one pattern and without different characteristic sizes, in accordance with the present disclosure.
Figure 23B:
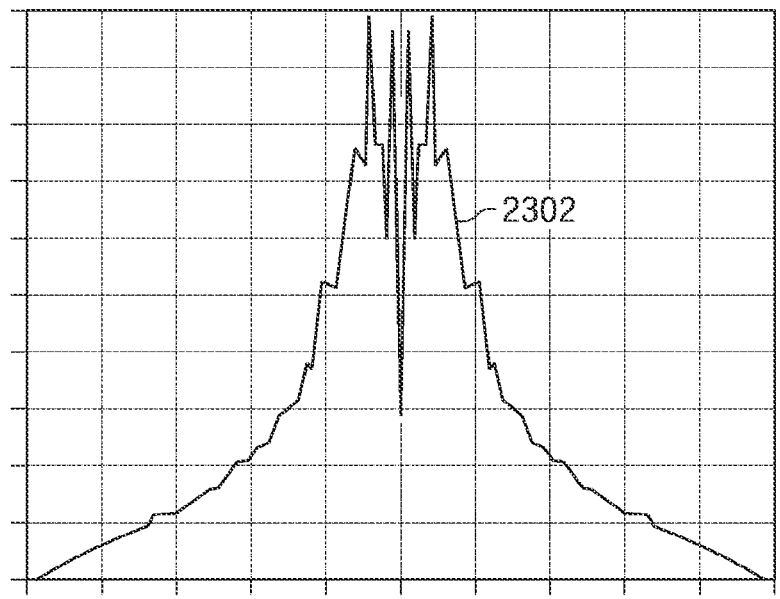
Figure 23C:
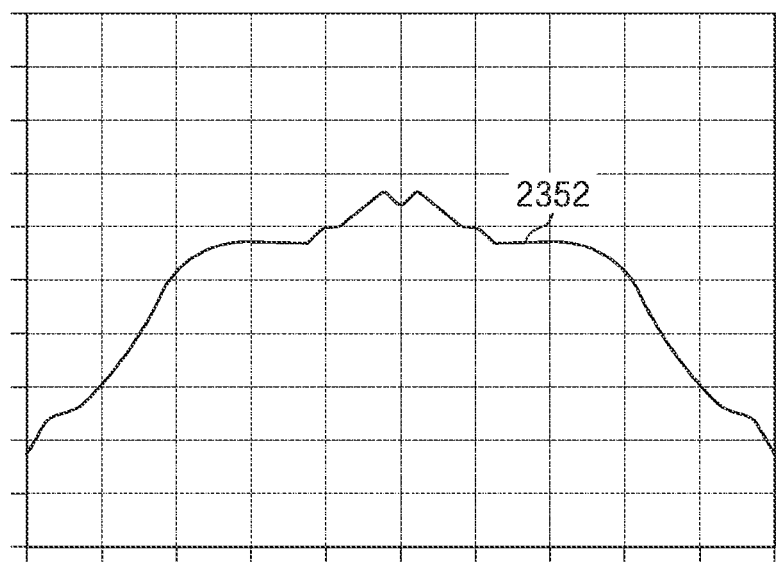
Figure 23D:
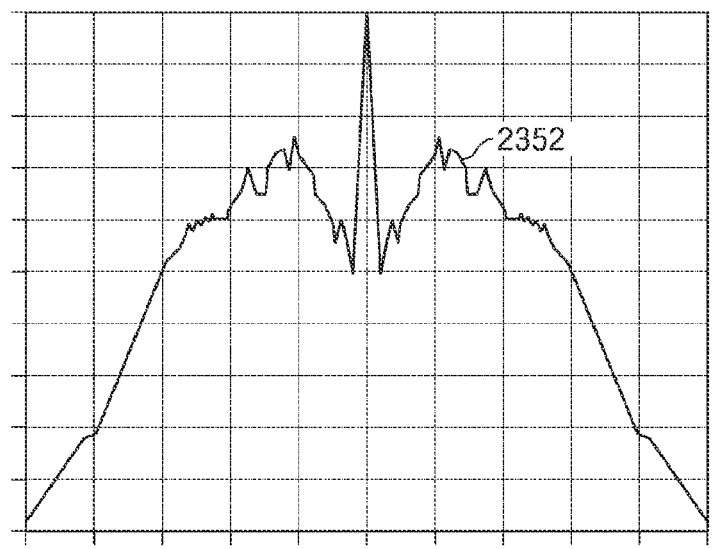

FIGS. 23A to 23D are graphs showing a comparison of the gains and contrasts of both a diffuser composed of two patterns and different characteristic sizes versus a diffuser composed of one pattern and without different characteristic sizes. The gain calculated from the diffuser with different characteristic sizes yields a much smoother curve 2302 (see FIG. 23A) than the gain curve 2352 calculated from only a single periodic structure (see FIG. 23C). This is because the smaller feature size of the first structure allows the curve 2302 to become nearly ergodic in a smaller area, but the gain of the two structures is approximately the same. More importantly, the peak contrast of the two-pattern diffuser (see FIG. 23B, showing an enlarged portion of FIG. 23A) is substantially five times larger than the peak contrast of the single pattern diffuser (see FIG. 23D, showing an enlarged portion of FIG. 23B). The average contrast is more than twice as large.

In conclusion, a practical technique of increasing the maximum contrast in a purely statistical structure is to superpose two patterns with different periodicities. The practical limitations of this technique are that the smaller feature should preferably remain large relative to the wavelength of light (e.g., in the order of 10's of μm) and the larger feature should preferably remain small relative to a pixel (e.g., in the order of 100's of μm). With holographic diffusers, this can be accomplished by performing two exposures in which the second exposure is adjusted to have approximately ⅕ of the height and 5 times the frequency. Another technique to accomplish this would be to apply a high gain metal flake paint to an embossed substrate.

Custom Design

Given the ability to precision engineer the height of the surface on a point by point basis, a technique for designing that surface is also disclosed herein. In principle, it is possible to treat the diffuser surface as a connected web of polygons. One may then perform a Monte-Carlo simulation to find the optimum orientation and height of these polygons that optimizes the diffusion characteristics of the surface. However, since ergodicity is desired over a small region, limitation on minimum feature size, as well as the constraints on multiple reflections makes this an unnecessarily expensive computation. It is more practical to instead use a specific generating function that is then replicated over the surface of the diffuser. This function can be generic, such as a Gaussian, in which case the statistics should preferably be constrained in an essentially non-Gaussian way in order to satisfy the design constraints. Alternatively, the function may be a generating kernel that locally satisfies the desired property of ergodicity.

Figure 24A:
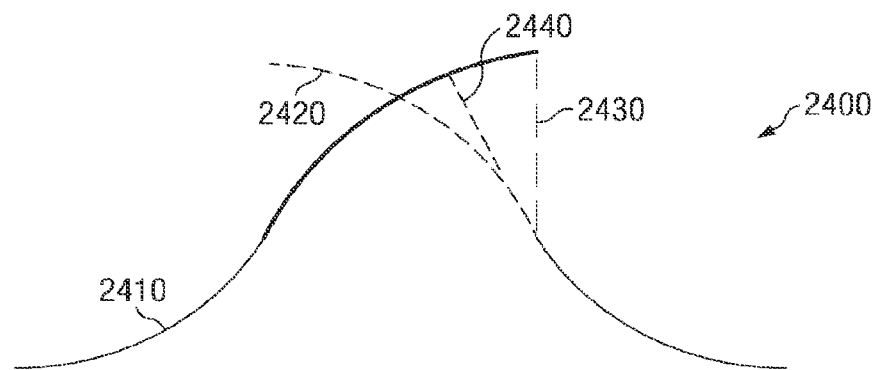
FIGS. 24A to 24B are graphs illustrating overlapping functions, in accordance with the present disclosure.
Figure 24B:
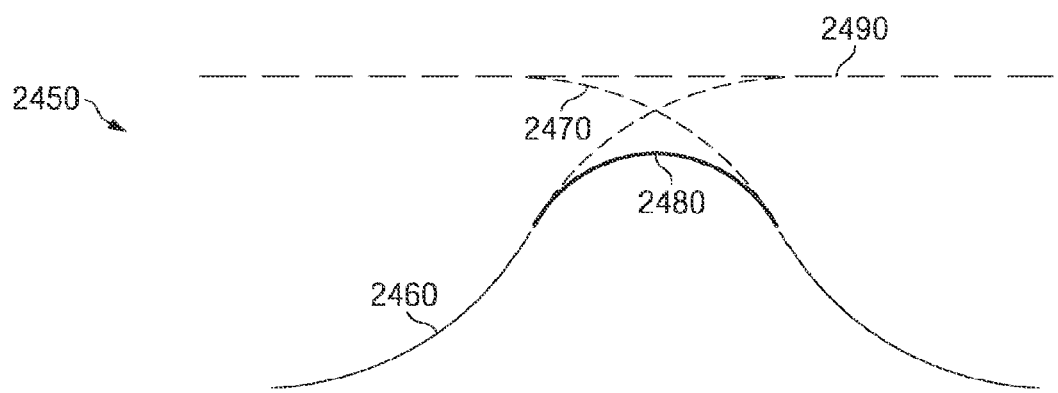

Once a generating function is identified, the function may be replicated in two dimensions in order to fill the surface. Any 2D curved surface can be represented by a 2D array of values representing the height of the surface. For example, the pixel values in FIG. 22 represent the height of the surface at each point. To fill the entire array, multiple copies of the generating function may be tiled. Two straightforward and computationally inexpensive methods to fill such an array with multiple copies of the generating function are substitution and addition. Substitution consists of replacing the pixel values within a section of the final array with the pixel values of the generating function. In regions where two generating functions might overlap, one of them may be truncated. FIG. 24A is a graph 2400 illustrating truncated overlapping functions 2410 and 2420. Overlapping results in a vertical facet 2430 that must be corrected to prevent sources of multiple scattering. This can be accomplished by replacing the vertical facet with a sloped facet 2440 that directs light out of the diffusion locus, i.e., with slope larger than $\theta_c$ but still sufficiently small enough to prevent a second reflection. Addition consists of adding the pixel values of the generating function to the pixel values of the total array. FIG. 24B is a graph 2450 illustrating addition of the pixel values of the generating functions 2460 and 2470 to the pixel values of the total array. Note, that the height of the generating function is negative and that height=0 is denoted by line 2490. To ensure smooth, continuous transition, the height and slope of the generating function should approach zero at the boundary 2480. The advantage of this technique is that there are no facets at the boundaries and so it is in principle possible to make better use of the available light. However, on average, addition leads to a decrease in the average aspect ratio and thus an increase in the gain of the diffuser and thus must be corrected for as discussed below.

Informed by the exploration of random diffusers, even when the generating scattering feature has a cutoff angle that avoids a second reflection with the surface, multiple reflections occur when two peaks interact in a predictable way (i.e., when they exactly overlap or when they approach too closely). With Gaussian statistics, these situations are likely to occur for some finite percentage of features. Therefore, a straightforward technique to increase the contrast is to modify the statistics of the peak positions in an essentially non-Gaussian way to prevent the undesired events. The simplest way to do this is to limit the random translation of the peaks so that they cannot overlap. The translation must still be large enough to statistically hide the underlying hexagonal character of the lattice.

The derivation of a 2D diffuser lens is slightly more complicated than revolving the 1D curve. Assuming an axially symmetric distribution, the differential equation describing $\theta$ as a function of r is:

$$\frac{\text{flux}}{\text{steradian}} = \frac{I_o r dr}{\sin\theta d\theta} = \alpha D(\theta) \qquad 3)$$

where $\mathcal{D}(\theta)$ is the desired distribution function, $I_o$ is the incident flux per unit area, and $\alpha$ is a proportionality constant. To compute $\alpha$, the total flux incident on the generating kernel is equal to the integral of the distribution function over all solid angles:

$$I_o \pi (r_M^2 - r_m^2) = 2\pi \int_o^{\theta_c} \alpha D(\theta) \sin\theta d\theta$$

where $r_m$ is the inner radius of the generating kernel (which may equal 0), $r_M$ is the outer radius of the generating kernel, and $\theta_c$ is the cutoff angle of the distribution function. Once $\theta$ is known as a function of r, the next step is to integrate the slope of the surface to find the surface height:

$$\frac{dz}{dr} = \tan\frac{\theta}{2} \qquad 5)$$

Figure 25A:
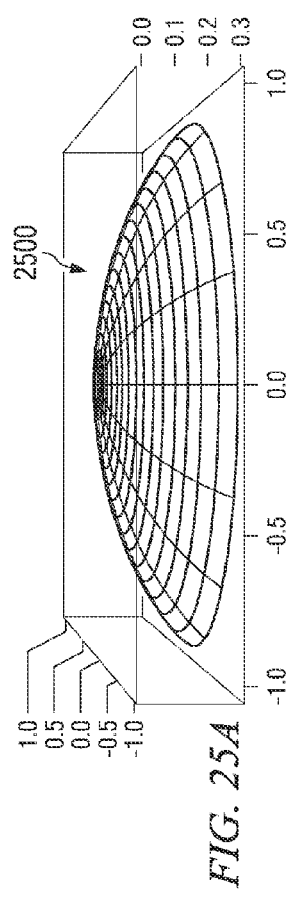
FIGS. 25A to 25C are graphs illustrating an exemplary generating kernel, in accordance with the present disclosure.
Figure 25B:
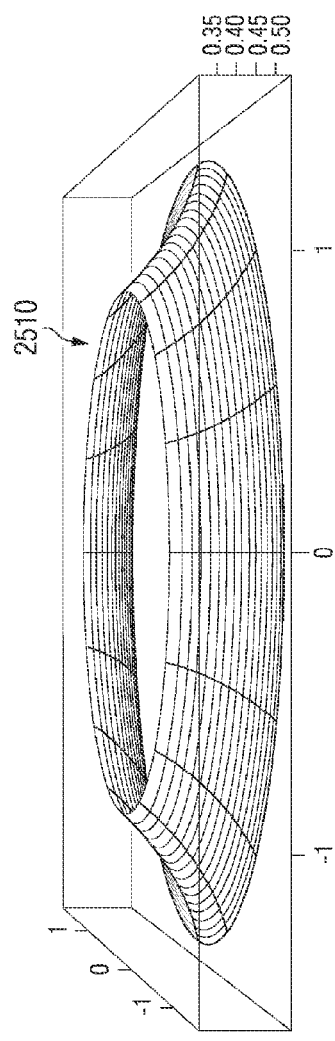
Figure 25C:
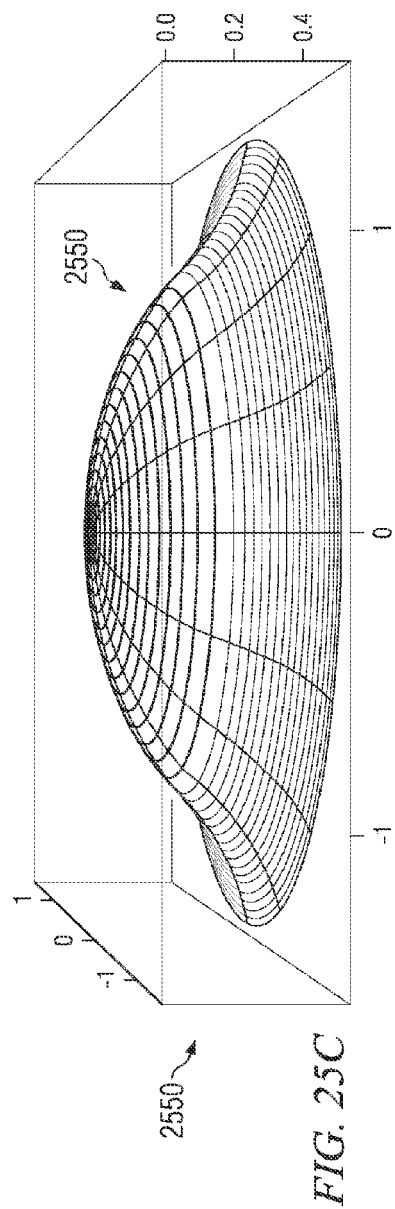

In general, this integration is quite difficult to perform analytically but may be accomplished numerically relatively easily. FIGS. 25A to 25C are graphs of several exemplary solutions to equations 3 to 5 for $\mathcal{D}(\theta)=\cos(\theta)$, i.e. a generating kernel or Lambertian diffuser. FIG. 25A is a graph 2500 of a solution generated in a circular region of maximum radius $r_M=1$, with the maximum slope on its outer boundary. FIG. 25B is a graph 2510 of an exemplary solution generated in an annular region with inner radius, $r_m=1$ and outer radius $r_M=1.5$. The maximum slope in region 2510 occurs on the inner surface and so the two solutions can be seamlessly joined together to form solution 2550. FIG. 25C is a graph 2550 of an exemplary generating kernel solution generated by combining solutions 2500 and 2510. Following this procedure, arbitrary diffusion profiles, $\mathcal{D}(\theta)$, are possible, subject to the aforementioned limitations on cutoff angle.

Figure 26:
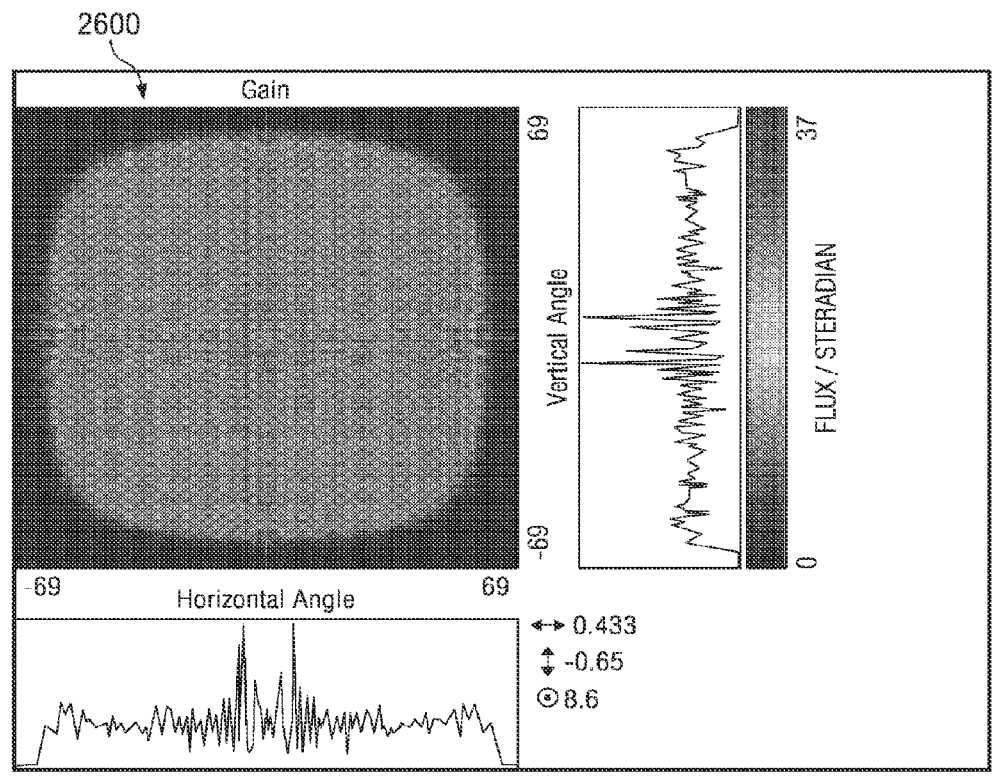
FIG. 26 is a graph illustrating the gain calculated for a two-dimensional Lambertian generating kernel, in accordance with the present disclosure.

FIG. 26 is a graph 2600 illustrating the gain simulated via non-sequential ray tracing for a 2D Lambertian generating kernel.

Figure 27:
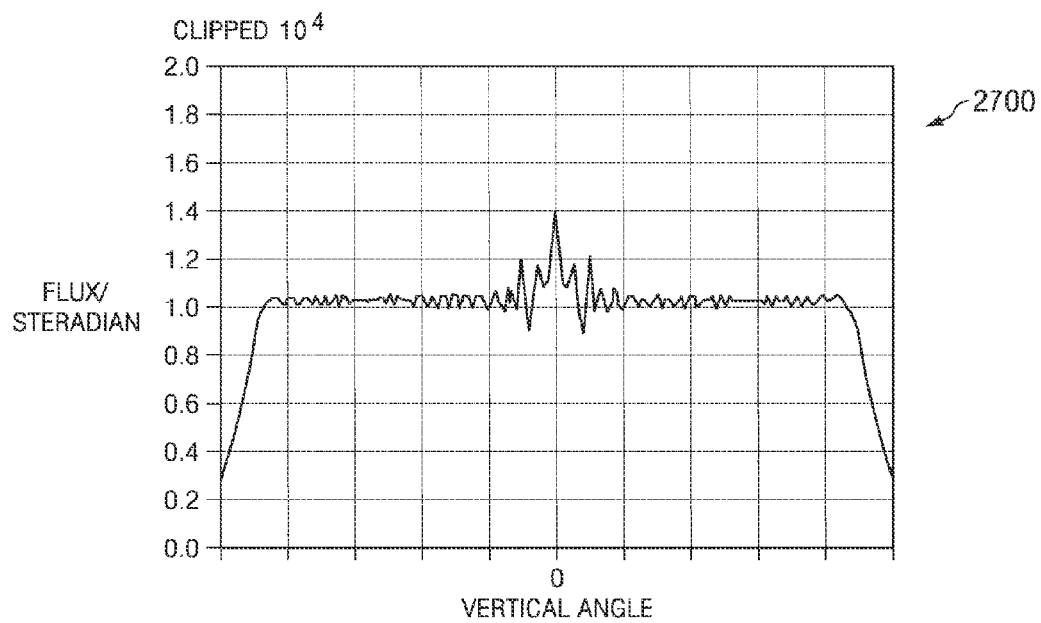
FIG. 27 is a graph illustrating radially-averaged gain for a generating kernel, in accordance with the present disclosure.

FIG. 27 is a graph 2700 of the radially-averaged gain for the generating kernel of FIG. 26. Completely filling a screen with a solution 2550 (as shown in FIG. 25C) presents the problems of substantially eliminating empty space, but with minimal distortion to the generating kernel.

Tiling the Generating Kernels

One way to fill a screen with the engineered generating kernels is to tile the generating kernels in a lattice configuration, e.g., a square, hexagonal, or any other regular shape lattice.

Figure 28:
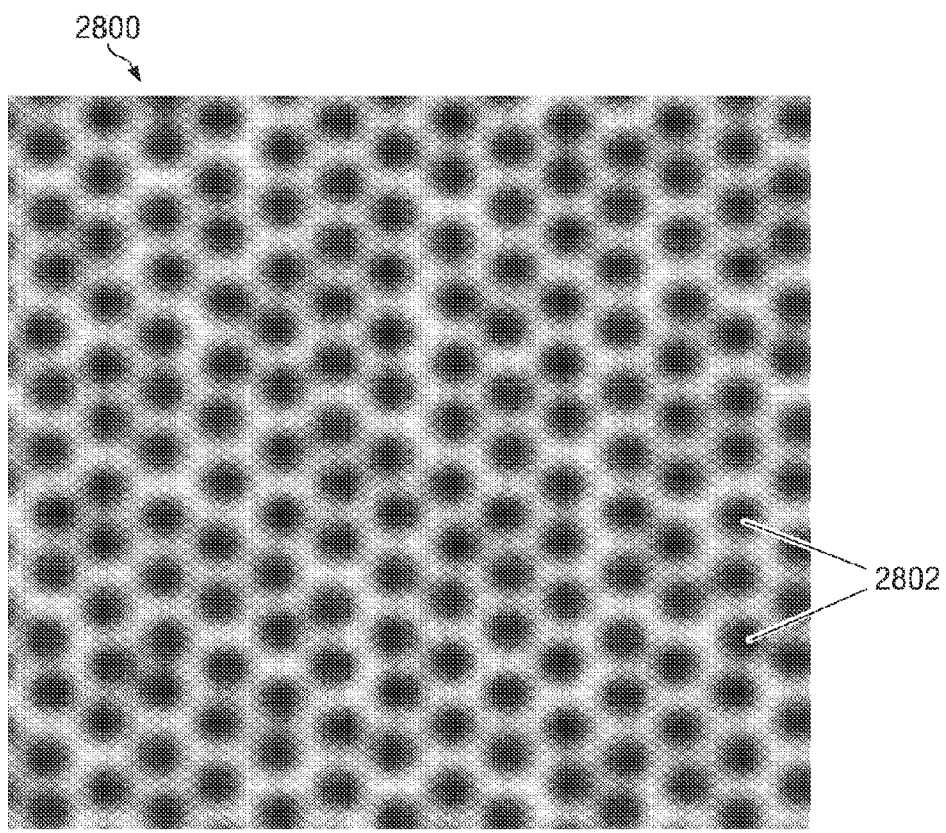
FIG. 28 is a schematic diagram illustrating an exemplary hexagonal lattice configuration, in accordance with the present disclosure.

FIG. 28 is a schematic diagram illustrating an exemplary hexagonal lattice 2800 configuration. As discussed above, however, empty space is undesirable in order to optimally use the available light and to prevent an increase in the specular reflectivity ("spike" in the reflectivity). To substantially eliminate empty space, generating kernels 2802 in a hexagonal lattice 2800 may undergo overlapping. For example, to eliminate empty space on a screen using a hexagonal lattice 2800 of generating kernels with a unit cell diameter of $2/\sqrt{3}$, approximately 20.9% of the unit cell areas would be overlapping.

Figure 29:
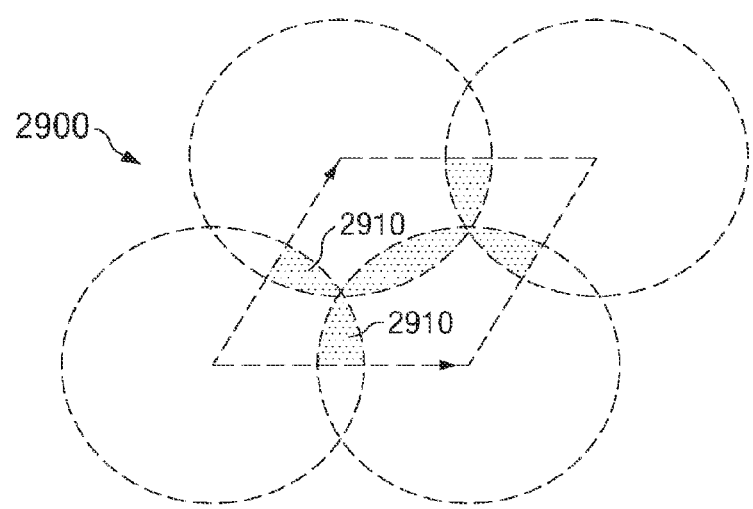
FIG. 29 is a schematic diagram illustrating the cell overlap of a hexagonal lattice of generating kernels, in accordance with the present disclosure.

FIG. 29 is a schematic diagram illustrating the unit cell overlap 2910 of a hexagonal lattice 2900 of generating kernels.

Figure 30:
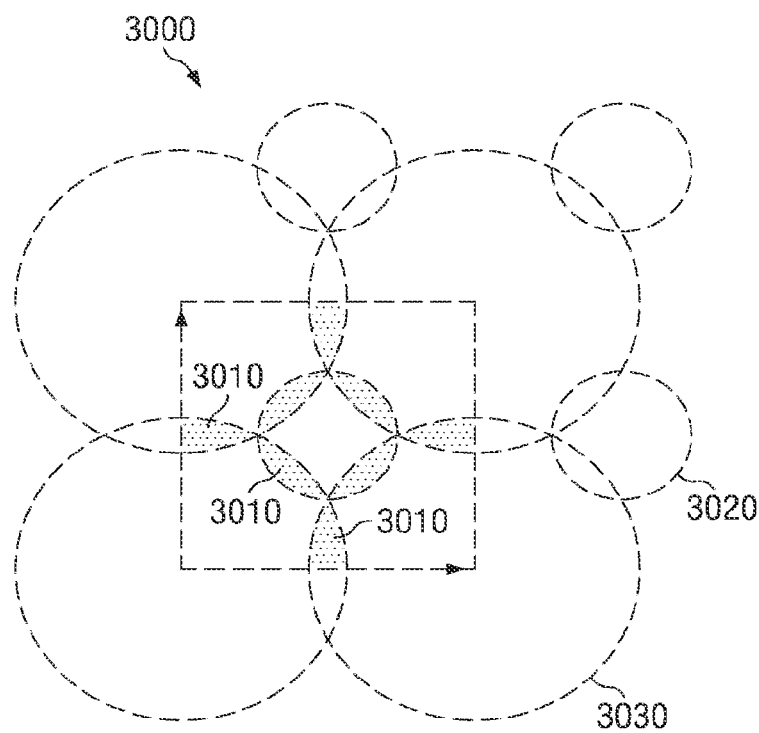
FIG. 30 is a diagram illustrating the cell overlap of a square lattice, in accordance with the present disclosure.

FIG. 30 is a diagram illustrating the unit cell overlap 3010 of a square lattice 3000. A square lattice 3000 may require an additional smaller unit cell 3020 to fill space, with the smaller unit cell's radius a function of the large cell's 3030 radius. In the square lattice 3000 configuration shown in FIG. 30, a 17.9% overlap is optimum. As discussed below, overlap of the generating kernels modifies the gain of the combined structure. The change in gain is a function of the center to center distance of the nearest-neighbor individual generating kernel which, in turn, is a function of the azimuth within the lattice. Therefore, a perfect lattice has a deviation in the scattered distribution reflecting the local arrangement of generating kernels. For example, a hexagonal lattice has six-fold symmetry in which the nearest neighbors of a given point are distributed around that point every 60°. Consequently, the scattered distribution will have an azimuthal modulation with a periodicity of 60° whose amplitude is proportional to the amount of overlap of the generating kernels. Regular lattices of generating kernels may lead to moiré, diffraction, and other undesirable effects. Modifying the regular lattice to achieve more randomization, for example, by using a hexagonal lattice with randomized lattice points, reduces these effects. Additional overlap may result from randomizing a regular lattice. Also, the sizes of the unit cells may be randomized in addition to their positions. However, in this case it becomes nearly impossible to pre-correct for overlap of the structures.

Figure 31:
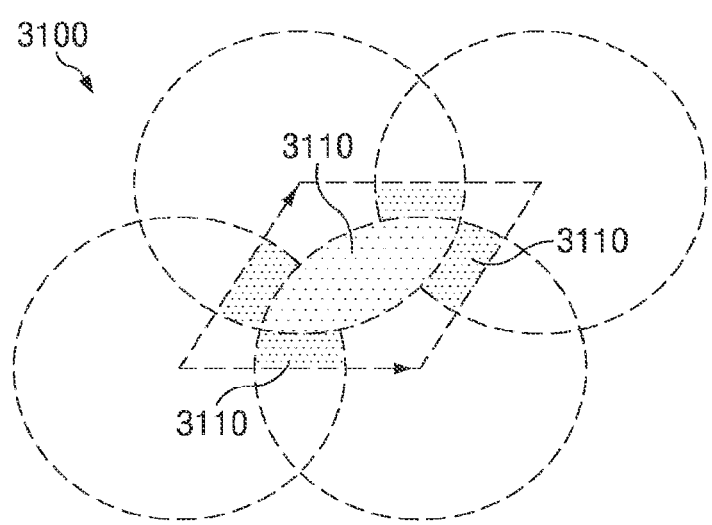
FIG. 31 is a schematic diagram of a hexagonal lattice with randomized centers, in accordance with the present disclosure.

FIG. 31 is a schematic diagram of a hexagonal lattice 3100 allowing 0.1 l of randomization of the center point. This configuration yields an overlap area 3110 of 60%.

Figure 32:
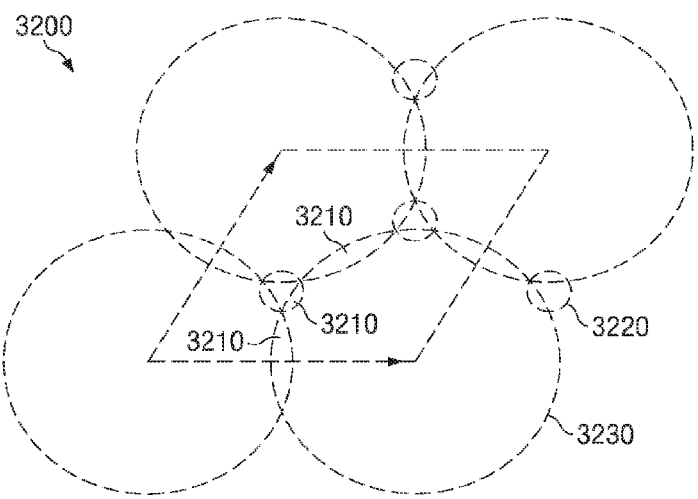
FIG. 32 is a schematic diagram of a hexagonal lattice with smaller cells dispersed in between the larger cells with lattice point randomization, in accordance with the present disclosure.

FIG. 32 is a diagram 3200 of a hexagonal lattice with smaller cells 3220 dispersed in between the larger cells 3230, resulting in a much smaller overlap area 3210 of 9.4%. The cell arrangement in FIG. 32 allows for more randomization.

Figure 33B:
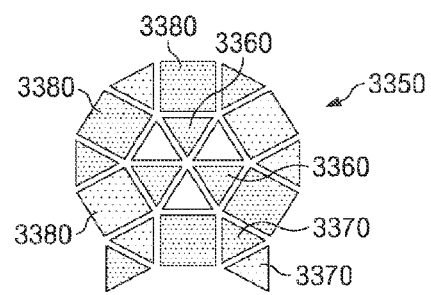
FIG. 33 is a schematic diagram of a semi-regular tessellation lattice, in accordance with the present disclosure.
Figure 33A:
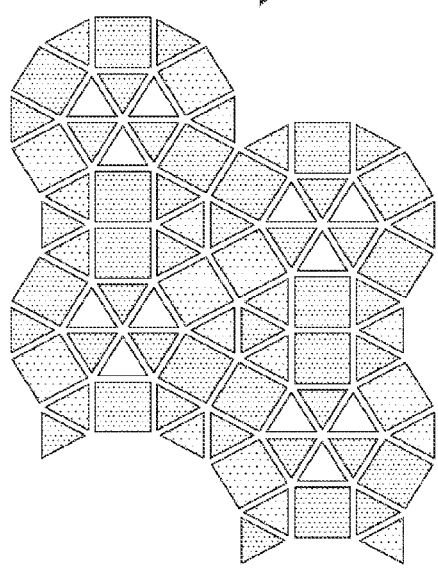
Figure 33C:
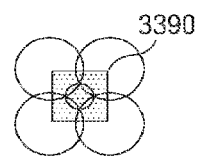
Figure 33D:
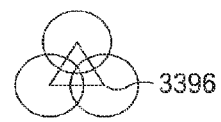

Other techniques may also be used to decrease the effect of the lattice. For example, by using a larger unit cell comprised of multiple generating kernels for the initial tiling, the amount of randomization necessary to hide the lattice structure in the scattering profile may be decreased. The hexagonal lattice has a six-fold rotational symmetry but if elements of two separate hexagonal lattices are combined with a 30° rotation between them, then the symmetry is increased to 12-fold. This can be accomplished by any number of infinite sets of semi- and demi-regular tessellations. Semi- and demi-regular tessellations typically comprise multiple polygon (e.g., triangles and squares) and thus feature sizes to fill the lattice, providing additional variation of the height and orientation of the scattering features and reduces interference. FIG. 33A is a schematic diagram 3300 illustrating a semi-regular tessellation pattern. FIG. 33B is a schematic diagram 3350 illustrating the unit cell of this tiling, which consists of two hexagonal lattice components 3360 and 3370 as well as three square lattices 3380. The vertices of the polygons indicate the centers of generating functions. The angular orientation of nearest-neighbor directions in this tessellation is 0, 30, 60, 90, 120 . . . 330 in contrast to 0, 60, 120 . . . 300 for the regular hexagonal lattice. Furthermore, the square elements introduce an additional set of angles: 15, 45, 75 . . . 345. FIGS. 33C and 33D are schematic diagrams illustrating vertices of the polygons 3390 and 3396 (and centers of the generating functions). The repeat distance of the structure is still significantly smaller than a pixel.

Arbitrarily large pseudo-random tilings can be generated by performing a 2D monte-carlo simulation of crystal melting. Such methods are well known for the study of interactions of hard disks as well as particles with arbitrary attractive/repulsive interaction potentials. The starting point of the simulation is to generate a 2D lattice of particles on a regular grid. A random particle is then picked from the ensemble and translated by a small fixed amount. If the translation results in a region that is not covered by any disk, then the move is rejected. If the translation results in a decrease in the total amount of overlap of the particles then it is accepted. If the total amount of overlap increases, then the move is accepted with a probability that is inversely proportional to the amount of increase. This process is repeated until the system reaches equilibrium. Typically, when packing constraints are emphasized in such a simulation, it will converge to a hexagonal lattice. Therefore, in order to suppress crystallinity while minimizing the overlap of particles, it is useful to add a random change in the size of the particle to the monte-carlo step (subject to similar constraints).

Figure 34:
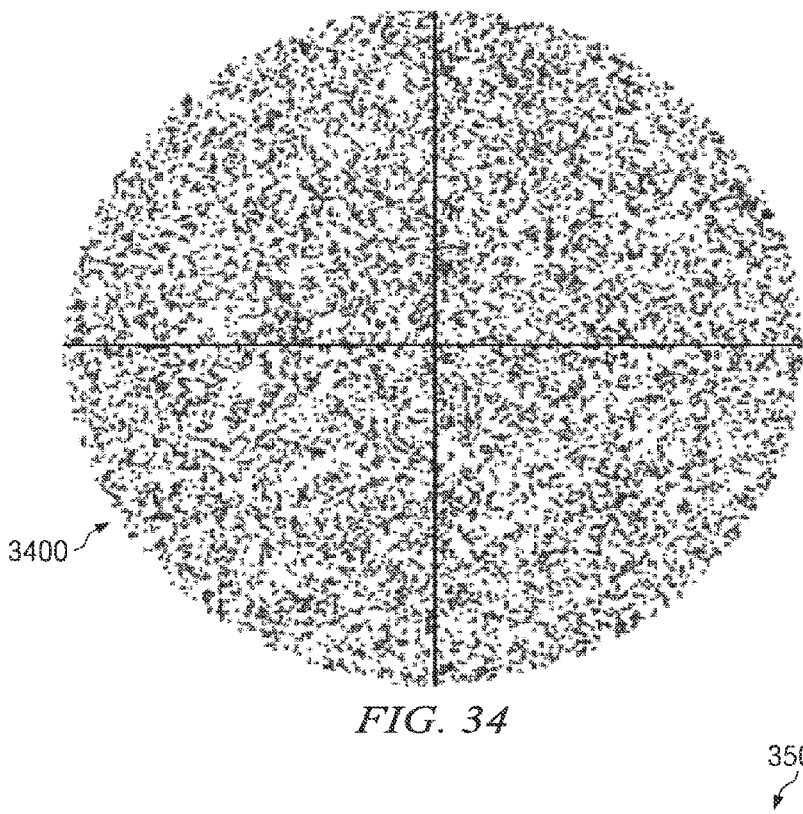
FIG. 34 is a diagram of randomization with horizontal displacement, in accordance with the present disclosure.

FIG. 34 is a schematic diagram 3400 of randomization via horizontal displacement. Uniformly generated displacements may ensure that the surface is fully covered, as shown in 3400.

Figure 35:
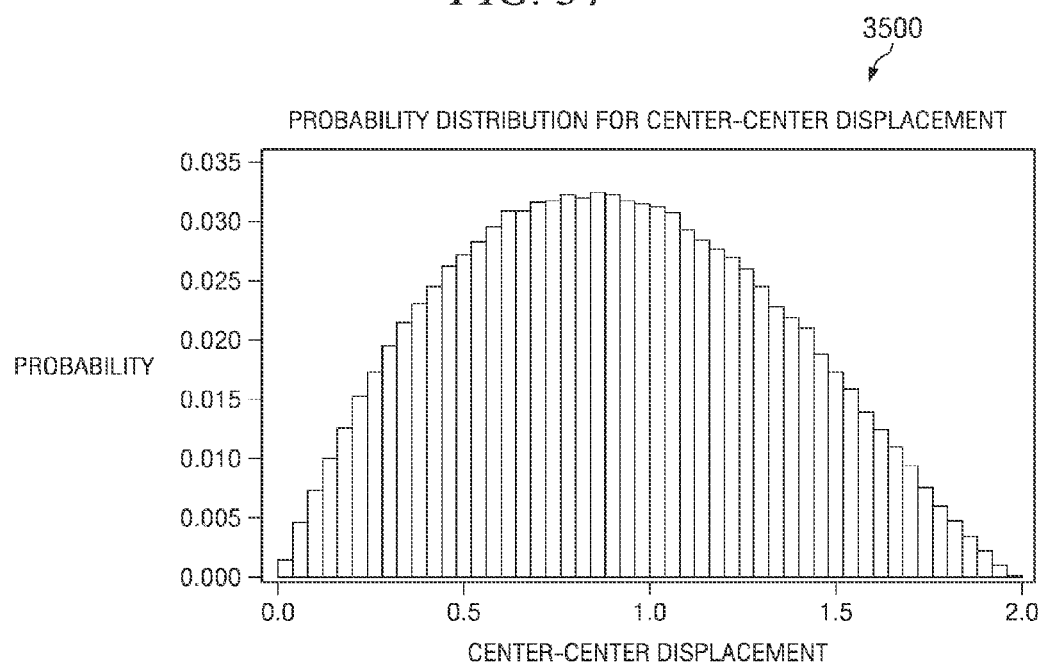
FIG. 35 is a graph of the probability distribution for cell center to cell center displacement for a surface with randomized horizontal displacement, in accordance with the present disclosure.

FIG. 35 is a graph 3500 of the probability distribution for cell center to cell center displacement for a surface with randomized horizontal displacement as shown in FIG. 34. As shown in graph 3500, the maximum displacement for adjacent structures is 2.0 and the mean displacement is 0.905.

A generic structure, for example, a Gaussian peak, does not necessarily produce the ideal scattering distribution. Instead, the statistics of the size and position of the structure may be controlled such that the distribution is achieved by some relatively large number of features. For cases where it is difficult to specifically engineer the unit cell of a diffuser, for example, holographic or etched diffusers, a generic feature such as a Gaussian peak is useful for determining design parameters. One cell, generating kernel, or microstructure comprising a plurality of generating kernels, would ideally have a slope approaching zero at a certain cut off radius, in order to allow cells to be stitched together seamlessly. An ideal generating kernel, an engineered generating kernel, or microstructure comprising a plurality of generating kernels, would also preferably be ergodic, in that the generating kernel individually produces the entire desired distribution function. A generating kernel that produces a Lambertian distribution is locally ergodic. An ergodic generating function helps ensure that intensity variations over the surface of the diffuser are minimized.

The diffusion features of an isolated Gaussian peak are modeled by the following equation:

$$z(r)=z_0 e^{-r^1}$$

The maximum slope of the isolated Gaussian peak occurs at $r=\frac{1}{2}$. The maximum reflected angle is:

$$\theta_{max}=2\tan^{-1}(\sqrt{2}z_0 e^{-1/2})$$

To produce a cut-off slope of $\theta_C$, select $z_0$:

$$z_0 = \frac{\tan(\theta_C/2)}{\sqrt{2}} e^{-1/2})$$

Again, adjacent peaks may cause double reflections depending on $\theta_C$ and proximity, but for $\theta_C$ less than ~80°, there are no multiple reflections (except for peaks which overlap), as shown in FIG. 20.

Figure 36:
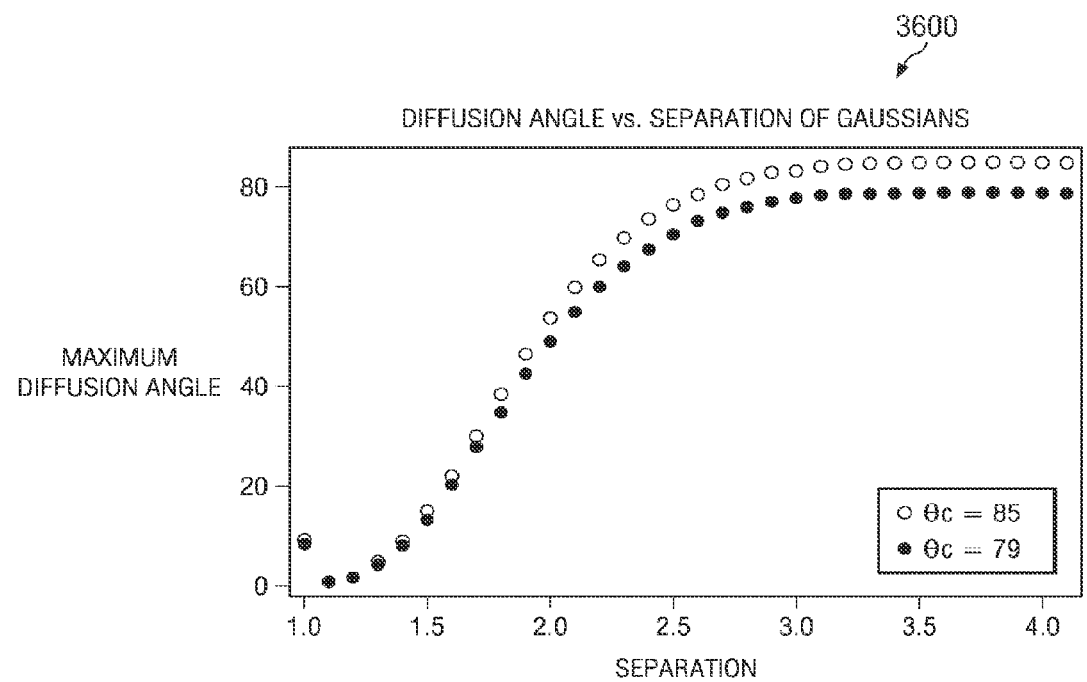
FIG. 36 is a graph of diffusion angle as a function of separation of Gaussian peaks, in accordance with the present disclosure.

FIG. 36 is a graph 3600 of diffusion angle as a function of separation of Gaussian peaks.

Figure 37:
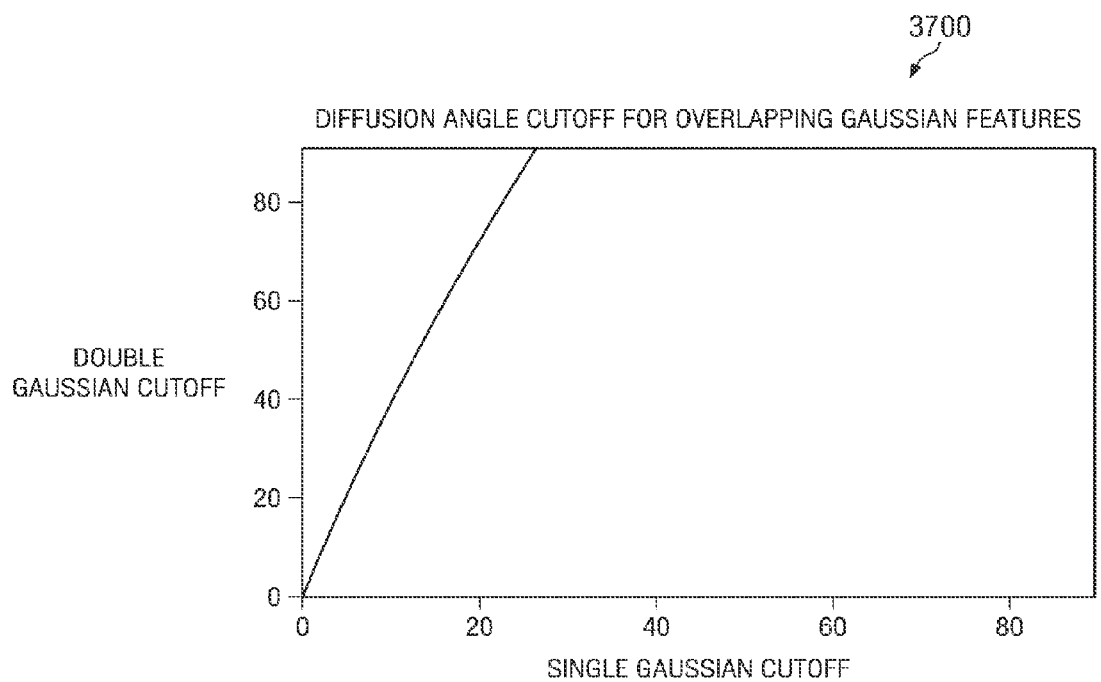
FIG. 37 is a graph illustrating diffusion angle cutoff for overlapping gaussian features, in accordance with the present disclosure.

FIG. 37 is a graph 3700 illustrating the cutoff angle of a structure with overlapping Gaussian features.

In the case of the engineered generating kernel, overlapping unit cells and randomizing the location of unit cells may result in similar problems disclosed above, for example, double reflections and changing of the gain profile. By choosing the additive method of placing unit cells within the array, the chance of double reflections is substantially eliminated, leaving the change in gain profile to correct.

Figure 38A:
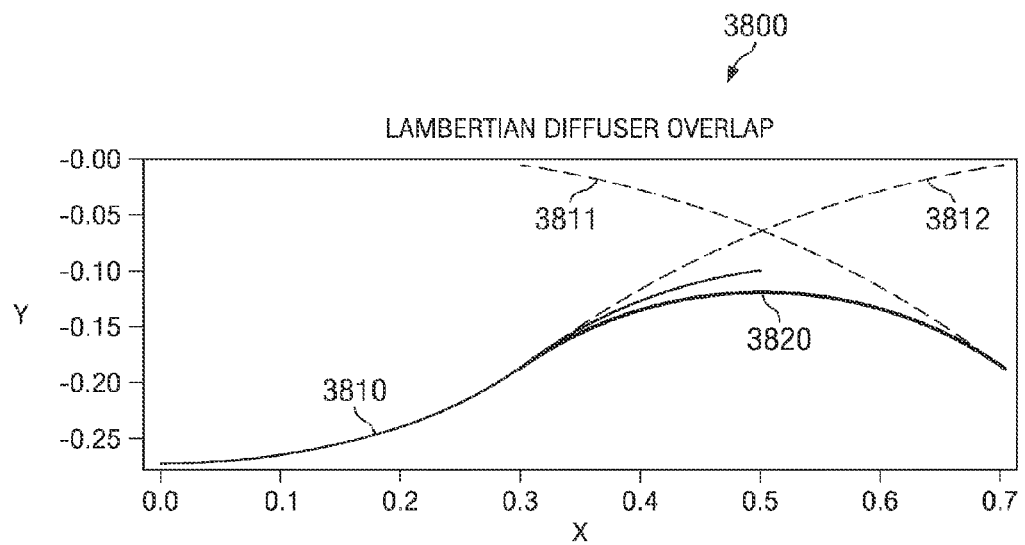
FIGS. 38A and 38B are graphs illustrating engineered Lambertian diffuser overlap in two configurations, in accordance with the present disclosure.
Figure 38B:
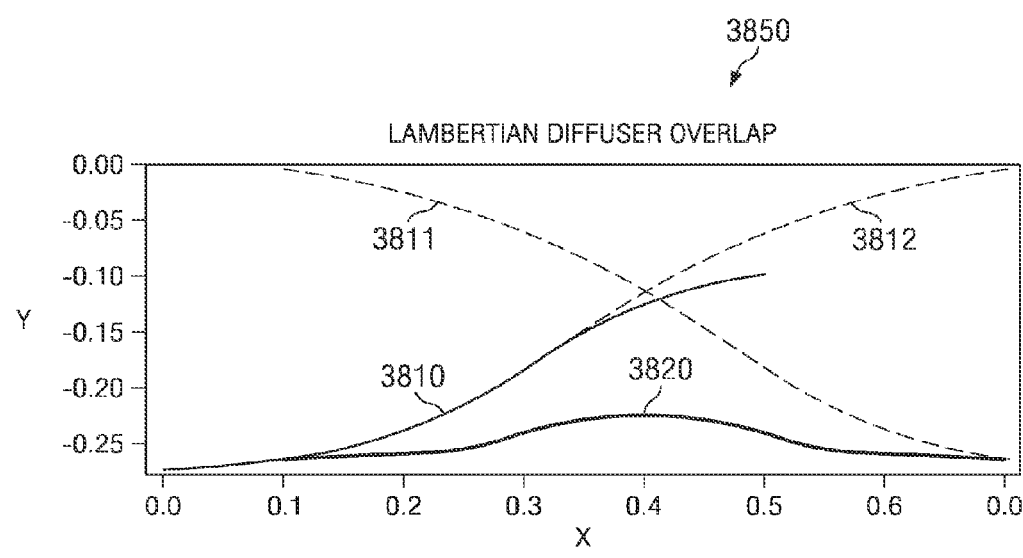

FIGS. 38A and 38B are graphs 3800 and 3850 illustrating engineered Lambertian diffuser overlap in two sample configurations. Lines 3810, 3811, and 3812 represent Lambertian surfaces. Line 3820 represents the sum of the lines 3811 and 3812, indicating that the gain of the sum-surface is too high in configuration 3800. When the generating kernels are moved even closer together in configuration 3850, line 3820 is pushed even further down, indicating that the gain is even higher.

Figure 39A:
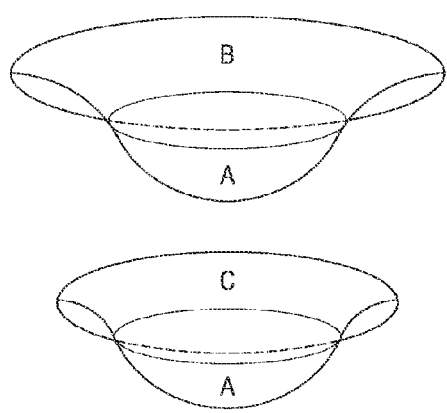
FIGS. 39A and 39B illustrate one method of pre-correcting the generating kernels to address overlap, in accordance with the present disclosure.
Figure 39B:
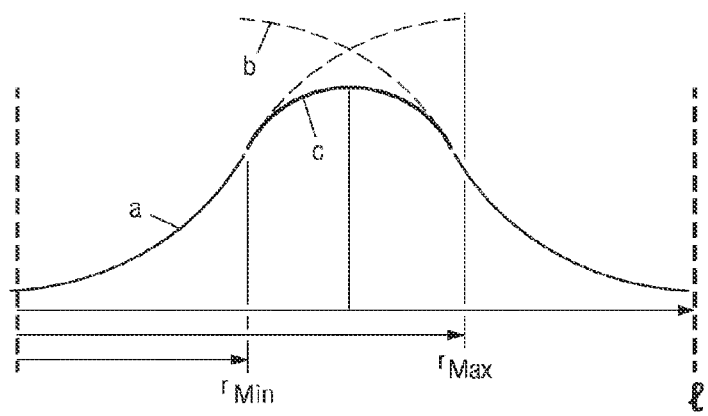

One way to address this problem is to pre-correct the generating kernels for overlap. FIGS. 39A and 39B illustrate one method of pre-correcting the generating kernels to address overlap. Generating kernel A, generated by revolving line a, is ergodic; generating kernel B, generated by revolving line b, is ergodic; and generating kernel C, generated by revolving line c, is as close to ergodic as possible, subject to constraint $$c'(r_{max})=0$$

where $$b(r)+b(r-l)=c(r); (r<l/2).$$

$$b'(r)+b'(r_{Max}-(r-r_{Min}))=c(r)$$

$$(b'(r)-b(r))^2+(b'(r_{Max}-(r-r_{Min}))-b(r_{Max}-r_{Min})))^2.$$

Figure 40:
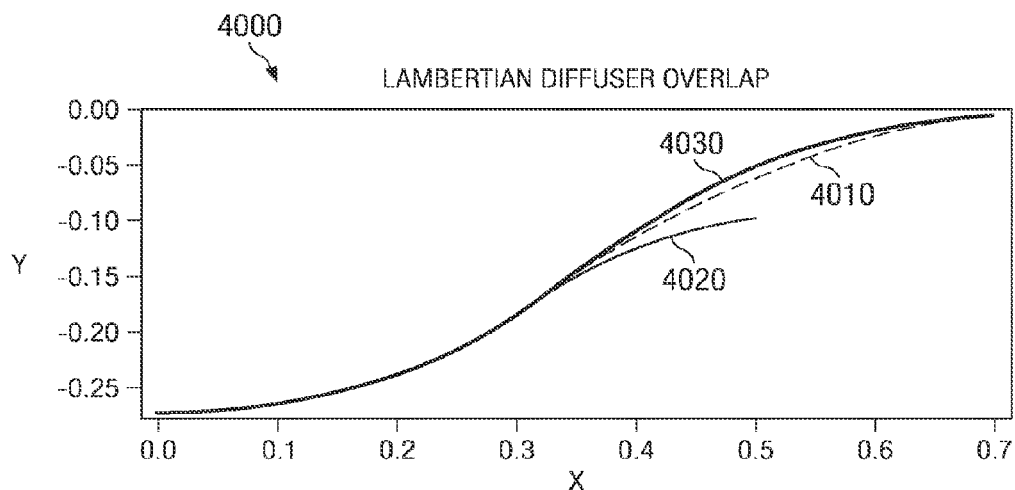
FIG. 40 is a graph of the pre-corrected cell with Lambertian diffuser overlap, in accordance with the present disclosure.

FIG. 40 is a graph 4000 of the pre-corrected cell with Lambertian diffuser overlap. Lines 4010 and 4020 represent the target diffuser shape. Line 4030 is the solution that produces line 4020 while minimizing deviation from line 4010. Although the calculation did not completely pre-correct an arbitrary gain profile for overlap, the results are highly sufficient. In this case, the slope is zero at the edges of the generating kernel. The gain profile has a sharp cutoff at 80°, which results in substantially no diffusion beyond 80°.

Figure 41A:
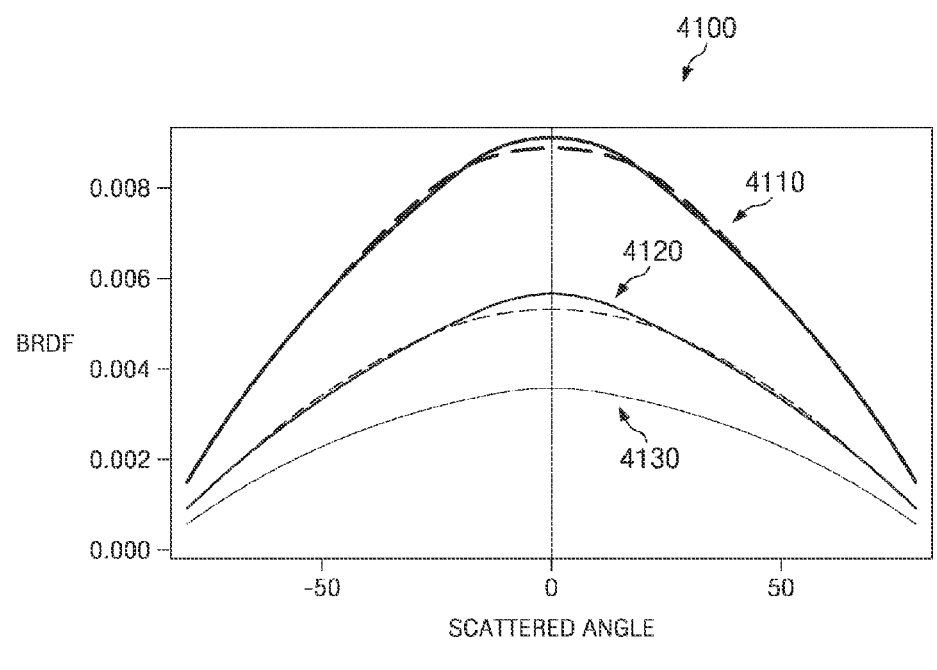
FIGS. 41A and 41B are graphs of gain profiles, in accordance with the present disclosure.
Figure 41B:
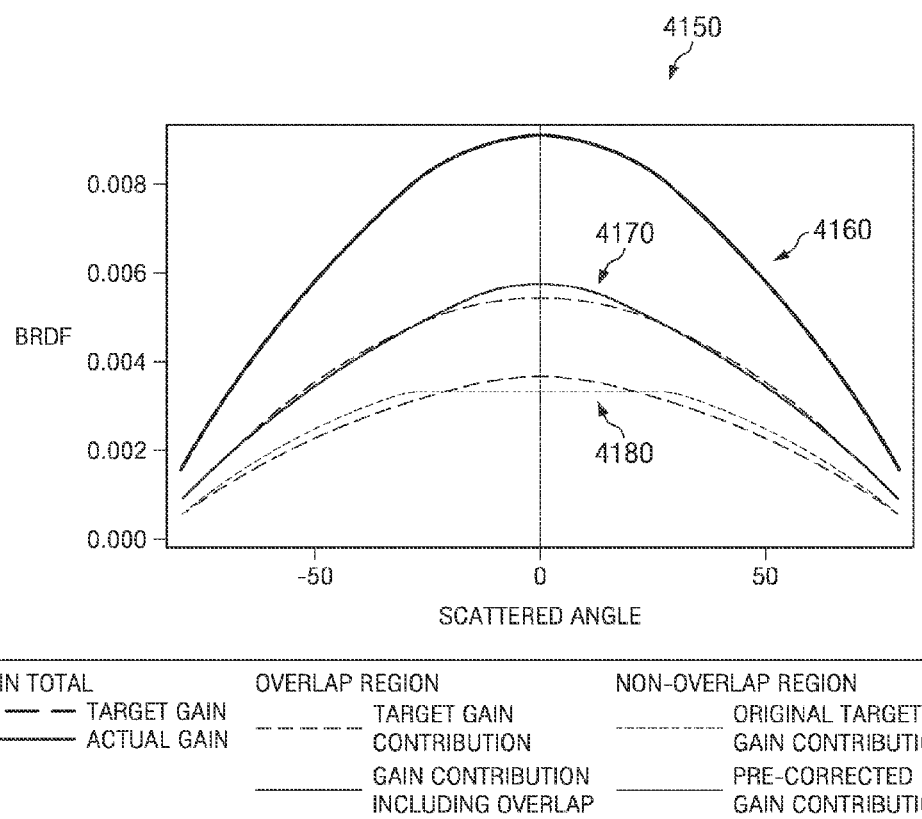

To the extent that pre-correction of the generating kernel profile for overlap is not sufficient, an additional step may be taken to arrive at the desired diffusion profile. FIG. 41A is a graph 4100 of an example gain profile 4110 showing separately the contributions from the overlapping regions 4120 and non-overlapping regions 4130 after the structure has been randomized. To the extent that the pre-correction of the overlap region is imperfect, the total gain does not track the target gain as shown by the lines 4110. The non-overlap regions may also be pre-corrected to account for the error. FIG. 41B shows a graph of an example gain profile in which the overlapping and non-overlapping regions have complementary corrections such that the total gain is equal to the target gain. The total gain can be written $$G(\theta)=G_a(\theta)A_a+G_b(\theta)A_b,$$

where $G(\theta)$ is the target gain, $G_a(\theta)/G_b(\theta)$ are the gain curves associated with non-overlapping and overlapping regions of the generating kernel, and $A_a/A_b$ are the areas of non-overlapping and overlapping regions respectively. To the extent that $G_b(\theta) \neq G(\theta)$, we can solve for a corrected gain contribution in the non-overlapping region, $G'_a(\theta)$ $$G'_a(\theta) = \frac{G(\theta) - G'_b(\theta)A_b}{A_a}.$$

Equations 3-5 must then be solved in order to find the correct shape for the region of the generating kernel not subject to overlap. The sum 4160 of both pre-corrected regions, the overlap 4170 and non-overlap 4180 regions, substantially matches the target gain profile. In contrast to the iterative design method described by Morris, this is a deterministic procedure that reaches the optimum design in a fixed number of steps, i.e. design of generating kernel in overlap region, pre-correction of generating kernel in overlap region, and design of generating kernel in non-overlap region.

The use of an engineered generating kernel as described above significantly reduces the grainy appearance problem associated with conventional silver screens. Because each individual generating kernel maps substantially the entire diffusion profile, large-scale spatial fluctuations due to statistical variation are largely avoided, even for large scattering angles, i.e., each individual generating kernel has at least two regions contributing to the intensity at any given azimuthal angle.

Randomizing the height of the surface of the diffuser by adding some form of noise can be used to address the problem of coherent speckle near the retro-reflection direction. The amplitude of this randomization should be some small multiple of an optical wavelength in order to scramble the phase of the reflected light.

Practical benefits and considerations associated with providing a screen in accordance with the present disclosure include minimum cost per unit area, spatial uniformity in performance, consistent performance reliability in manufacturing, and robustness in handling and cleaning.

The cost of screen material can be minimized by leveraging existing roll-to-roll processes as much as possible. The infrastructure to manufacture roll-stock of optimized screen material may include apparatus that performs micro-embossing, metallization, transparent dielectric (hard-coat) coatings, precision slitting and perforation (for acoustic transmission). There currently exist roll-to-roll embossing processes that are free of (transverse-direction) down-web seams associated with conventional nickel shims. According to the preferred manufacturing process, UV embossing with a seamless embossing drum produces continuous diffuser material. According to this process, diffuser roll stock is easily converted to finished screens by joining such strips. Using precision roll-to-roll slitting, such strips can be joined with butt-joints giving sufficiently small gaps that seams are substantially not visible in the theatre. With this approach, a back-end film joining process may be used to manufacture finished cinema screens. This process should preferably provide sufficient joint strength and reliability when the screen is mounted or stretched on the frame. The seam (and any surrounded area impacted by the joining process) should preferably be sufficiently small that it is not observable to the audience.

A potential benefit of film joining prior to coating (e.g., spray painting metal flake) is that optically thick layers can planarize small features. In practice, joins in such screens are frequently observable because there is an asymmetric "step" in the seam. Because of the high specular reflection, the associated macroscopic facet creates a large disruption in the angular dispersion of light. When the material is flat across the join (e.g., like a butt-joint), seams are generally not observable when the gap is below approximately 50 microns, and in most instances, up to 100 microns. This can probably be even larger when further steps are done to mask the join, such as randomizing the edge profile.

In the event that precision roll-to-roll slitting does not provide sufficient accuracy, another preferred technique for manufacturing the finished screen from coated strips, where strips hang vertically for strength reasons, is to simultaneously slit the sheets so that they can be easily butted together. This can be done by overlapping the sheets and using a single knife, or using a pair of knives with fixed separation. While this gives relief from edge straightness constraints, it is a batch process that is substantially more labor intensive than the precision roll-to-roll slitting approach.

After slitting, the two sheets can be butted together, either by driving the sheets together locally with a system of rollers of suitable profile, or by translating a sheet using a vacuum table to globally butt the materials together. With the coated surfaces face down, the films can be joined together using any one of several methods, including adhesives, chemicals, or welding processes. Adhesives can include UV cures, e-beam cure, or various thermo-set processes. Chemical bonding can include solvents, or doped solvents. Welding processes can include various means of delivering thermal energy to the join, preferably lasers.

Given the lack of surface area associated with a butt-joint, it is likely that additional mechanical support may be used to ensure joint strength. This can be provided using some form of backer-strip, which creates a T-joint. The thickness and size of the backer strip can be selected to ensure that the front surface of the finished (stretched) screen is uniform across the boundary. In some instances, it may be preferable to laminate the entire screen to a secondary backer sheet, such as a fabric, which further improves the strength and appearance.

A more sophisticated screen design according to the present disclosure may involve local (position specific) control of diffusion properties. This can be done by manufacturing rolls of material that are dedicated to specific locations on the screen. Typically, this involves a bias angle in the diffusion direction, or in the case of a Lambertian-like screen, a (first-order) bias in the location of the centroid of the locus.

Assuming that the screen stock is made using roll-to-roll processing, and that the strips are again hung vertically, the local correction is likely to be in the horizontal direction. The design of the cross-web diffusion profile of any sheet can vary adiabatically, such that there is no abrupt change in diffusion profile at the boundary between sheets. This allows very large screens with quasi-continuously varying optimized diffusion properties in the horizontal direction.

A screen manufactured as described above could have the same performance as a screen curved about the vertical, but in a flat format. Moreover, the effective performance of a compound-curved (e.g., toroidal) screen could be achieved by curving the aforementioned screen about the horizontal axis. This eliminates the complications of manufacturing a large compound curved screen (e.g., pulling vacuum on the volume behind flat/flexible screen material).

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A projection screen, comprising:
a contoured reflective surface having a predetermined scatter profile, the predetermined scatter profile being operable to reflect incident light from a predetermined incident angle range to within a diffusion locus,
wherein the light reflected from the predetermined incident angle range to within the diffusion locus substantially undergoes no more than one reflection from the contoured reflective surface, wherein the diffusion locus is defined by a region in which reflections within the diffusion locus substantially undergo no more than one reflection on the contoured reflective surface, and wherein light reflected outside of the diffusion locus undergoes one or more reflections on the contoured reflective surface.

2. The projection screen of claim 1, wherein the incident light is polarized light, and wherein light reflected from the predetermined incident angle range to within the diffusion locus maintains the same state of polarization.

3. The projection screen of claim 1, wherein the contoured reflective surface comprises a plurality of generating kernels.

4. The projection screen of claim 3, wherein each generating kernel substantially satisfies the predetermined scatter profile.

5. The projection screen of claim 4, wherein each generating kernel is operable to minimize point-to-point variation in diffusion.

6. The projection screen of claim 3, wherein the plurality of generating kernels are distributed to optimize viewing from a location in the diffusion locus.

7. The projection screen of claim 3, wherein the plurality of generating kernels satisfy the predetermined scatter profile.

8. The projection screen of claim 7, wherein the plurality of generating kernels is operable to minimize point-to-point variation in diffusion.

9. The projection screen of claim 3, wherein the plurality of generating kernels satisfies a statistical model to minimize double reflections between generating kernels.

10. The projection screen of claim 3, further comprising a dielectric overcoat, the dielectric overcoat distributed over the plurality of generating kernels.

11. The projection screen of claim 3, wherein the plurality of generating kernels are distributed in a substantially regular lattice.

12. The projection screen of claim 11, wherein the substantially regular lattice comprises a hexagonal lattice.

13. The projection screen of claim 11, wherein the plurality of generating kernels are distributed in a tessellation pattern.

14. The projection screen of claim 11, wherein the substantially regular lattice comprises randomized centers.

15. The projection screen of claim 11, wherein at least two of the generating kernels are substantially overlapping.

16. The projection screen of claim 11, wherein at least one of the generating kernels is disposed to pre-correct for an offset resulting from overlapping adjacent generating kernels.

17. The projection screen of claim 1, wherein the diffusion locus is defined by a predetermined reflection angle range.

18. The projection screen of claim 1, wherein substantially all light undergoing more than one reflection is distributed outside of the diffusion locus.

19. The projection screen of claim 1, wherein the diffusion locus includes substantially all viewing locations in an auditorium.

20. The projection screen of claim 1, wherein light reflected to the diffusion locus is of enhanced brightness.

21. The projection screen of claim 1, wherein light reflected to the diffusion locus is substantially uniform.

22. The projection screen of claim 1, wherein light reflected to the diffusion locus is of enhanced contrast.

23. The projection screen of claim 1, wherein light reflected to the diffusion locus satisfies a predetermined gain profile.

24. A method for providing a projection screen, the method comprising:
providing a contoured reflective surface having a predetermined scatter profile, the predetermined scatter profile being operable to reflect incident light from a predetermined incident angle range to within a diffusion locus,
wherein the light reflected from the predetermined incident angle range to within the diffusion locus substantially undergoes no more than one reflection from the contoured reflective surface, further comprising defining the diffusion locus by a region in which reflections within the diffusion locus substantially undergo no more than one reflection on the contoured reflective surface, and wherein light reflected outside of the diffusion locus undergoes one or more reflections on the contoured reflective surface.

25. The method of claim 24, wherein the incident light is polarized light, and wherein light reflected from the predetermined incident angle range to within the diffusion locus maintains the same state of polarization.

26. The method of claim 24, wherein the contoured reflective surface comprises a plurality of generating kernels.

27. The method of claim 26, further comprising satisfying the predetermined scatter profile with each generating kernel.

28. The method of claim 27, further comprising minimizing point-to-point variation in diffusion with each generating kernel.

29. The method of claim 26, further comprising satisfying the predetermined scatter profile with the plurality of generating kernels.

30. The method of claim 29, further comprising minimizing point-to-point variation in diffusion with the plurality of generating kernels.

31. The method of claim 26, further comprising satisfying a statistical model to minimize double reflections between generating kernels with the plurality of generating kernels.

32. The method of claim 26, further comprising distributing the plurality of generating kernels to optimize viewing from a location in the diffusion locus.

33. The method of claim 26, further comprising:
providing a dielectric overcoat; and
distributing the dielectric overcoat over the plurality of generating kernels.

34. The method of claim 26, further comprising distributing the plurality of generating kernels in a substantially regular lattice.

35. The method of claim 34, further comprising randomizing the centers of the substantially regular lattice.

36. The method of claim 34, further comprising overlapping at least two of the generating kernels.

37. The method of claim 26, further comprising distributing the plurality of generating kernels in a substantially hexagonal lattice.

38. The method of claim 26, further comprising distributing the plurality of generating kernels in a tessellation pattern.

39. The method of claim 26, further comprising disposing at least one of the generating kernels to pre-correct for an offset resulting from overlapping adjacent generating kernels.

40. The method of claim 24, further comprising defining the diffusion locus by a predetermined reflection angle range.

41. The method of claim 24, further comprising eliminating substantially all light undergoing multiple reflections from being distributed within the diffusion locus.

42. The method of claim 24, further comprising distributing substantially all light undergoing more than one reflection outside of the diffusion locus.

43. The method of claim 26, further comprising including substantially all viewing locations in an auditorium in the diffusion locus.

44. The method of claim 24, further comprising enhancing the brightness of the light reflected to the diffusion locus.

45. The method of claim 24, further comprising making substantially uniform the light reflected to the diffusion locus.

46. The method of claim 24, further comprising enhancing the contrast of the light reflected to the diffusion locus.

47. The method of claim 24, further comprising satisfying a predetermined gain profile with the light reflected to the diffusion locus.

48. A projection screen, comprising:
a contoured reflective surface having a predetermined scatter profile, the predetermined scatter profile being operable to reflect incident light from a predetermined incident angle range to within a diffusion locus,
wherein the light reflected from the predetermined incident angle range to within the diffusion locus substantially undergoes no more than one reflection from the contoured reflective surface, and
wherein the contoured reflective surface is operable to substantially eliminate light undergoing multiple reflections from being distributed within the diffusion locus.

* * * * *